(12) United States Patent
Stjernstedt

(10) Patent No.: US 11,597,017 B2
(45) Date of Patent: Mar. 7, 2023

(54) TURNING TOOL AND TURNING METHOD FOR CNC-MACHINES

(71) Applicant: AB SANDVIK COROMANT, Sandviken (SE)

(72) Inventor: Per-Anders Stjernstedt, Gavle (SE)

(73) Assignee: AB Sandvik Coromant, Sandviken (SE)

( * ) Notice: Subject to any disclaimer, the term of this patent is extended or adjusted under 35 U.S.C. 154(b) by 200 days.

(21) Appl. No.: 16/978,121

(22) PCT Filed: Jan. 29, 2019

(86) PCT No.: PCT/EP2019/052079
§ 371 (c)(1),
(2) Date: Sep. 3, 2020

(87) PCT Pub. No.: WO2019/170324
PCT Pub. Date: Sep. 12, 2019

(65) Prior Publication Data
US 2021/0008635 A1     Jan. 14, 2021

(30) Foreign Application Priority Data
Mar. 8, 2018    (EP) ..................................... 18160706

(51) Int. Cl.
*B23B 27/16*    (2006.01)
*B23B 1/00*    (2006.01)
*B23B 29/04*    (2006.01)

(52) U.S. Cl.
CPC ............ *B23B 27/1611* (2013.01); *B23B 1/00* (2013.01); *B23B 29/046* (2013.01);
(Continued)

(58) Field of Classification Search
CPC .................. B23B 29/046; B23B 29/04; B23B 2210/02; B23B 2220/12; B23B 1/00; B23B 27/10;
(Continued)

(56) References Cited

U.S. PATENT DOCUMENTS 5,607,263 A  *  3/1997  Nespeta ................ B23B 27/007
                                                                407/53
7,219,584 B2 *  5/2007  Edler .................... B23B 29/242
                                                                82/159

(Continued)

FOREIGN PATENT DOCUMENTS

DE    102015216203 A1    3/2017
DE    102019128697 A1 *  7/2020 ............. B23B 27/00
(Continued)

*Primary Examiner* — Sara Addisu
(74) *Attorney, Agent, or Firm* — Corinne R. Gorski

(57) ABSTRACT

A cutting tool for turning includes a coupling portion, an intermediate portion and a cutting portion. The intermediate portion extends along a longitudinal center axis thereof between the coupling portion and the cutting portion. The cutting portion includes a first and a second nose portion. The first nose portion has a first cutting edge, a second cutting edge, and a convex nose cutting edge connecting the first and second cutting edges. The first and second cutting edges form a nose angle less than 90°. A longitudinal center axis of the coupling portion defines a tool rotational axis. The cutting portion includes a top surface, the top surface facing away from the coupling portion and the first and the second nose portions each form free ends of the cutting tool.

14 Claims, 10 Drawing Sheets

(52) U.S. Cl.
CPC ............ *B23B 2200/049* (2013.01); *B23B 2200/161* (2013.01); *B23B 2200/165* (2013.01); *B23B 2205/12* (2013.01)

(58) Field of Classification Search
CPC ........... B23B 27/1611; B23B 2200/165; B23B 2200/049; Y10T 407/21; Y10T 409/50
See application file for complete search history.

(56) References Cited

U.S. PATENT DOCUMENTS

| | | | | |
|---|---|---|---|---|
| 7,416,372 | B2* | 8/2008 | Hyatt | .................... B23B 1/00 407/65 |
| 9,180,524 | B2* | 11/2015 | Campbell | ................. B23C 3/34 |
| 9,352,402 | B2* | 5/2016 | Luik | ..................... B23C 5/006 |
| 9,776,251 | B2* | 10/2017 | Okida | ..................... B23B 27/12 |
| 11,396,048 | B2* | 7/2022 | Johansson | ............. B23B 27/007 |
| 11,396,051 | B2* | 7/2022 | Maier | ....................... B23B 1/00 |
| 2004/0013143 | A1 | 1/2004 | Springthorpe et al. | |
| 2005/0047885 | A1 | 3/2005 | Hyatt et al. | |
| 2007/0081867 | A1* | 4/2007 | Murakami | .............. B23B 29/02 407/11 |
| 2009/0052999 | A1 | 2/2009 | Phillips | |
| 2012/0201616 | A1* | 8/2012 | Hecht | ................... B23B 27/007 407/120 |
| 2014/0294525 | A1* | 10/2014 | Hecht | ................. B23B 27/1651 407/103 |
| 2020/0215628 | A1* | 7/2020 | Kanz | ...................... B23D 13/00 |
| 2020/0406362 | A1* | 12/2020 | Stjernstedt | .............. B23B 29/04 |

FOREIGN PATENT DOCUMENTS

| | | | | |
|---|---|---|---|---|
| EP | 1158378 | B1 | 11/2001 | |
| EP | 1702703 | A1 | 9/2006 | |
| EP | 3153257 | A1 | 10/2015 | |
| EP | 3501701 | A1 * | 6/2019 | ............... B23B 1/00 |
| WO | WO-2004022270 | A1 * | 3/2004 | ............... B23B 1/00 |
| WO | 2011047126 | A1 | 4/2011 | |

\* cited by examiner

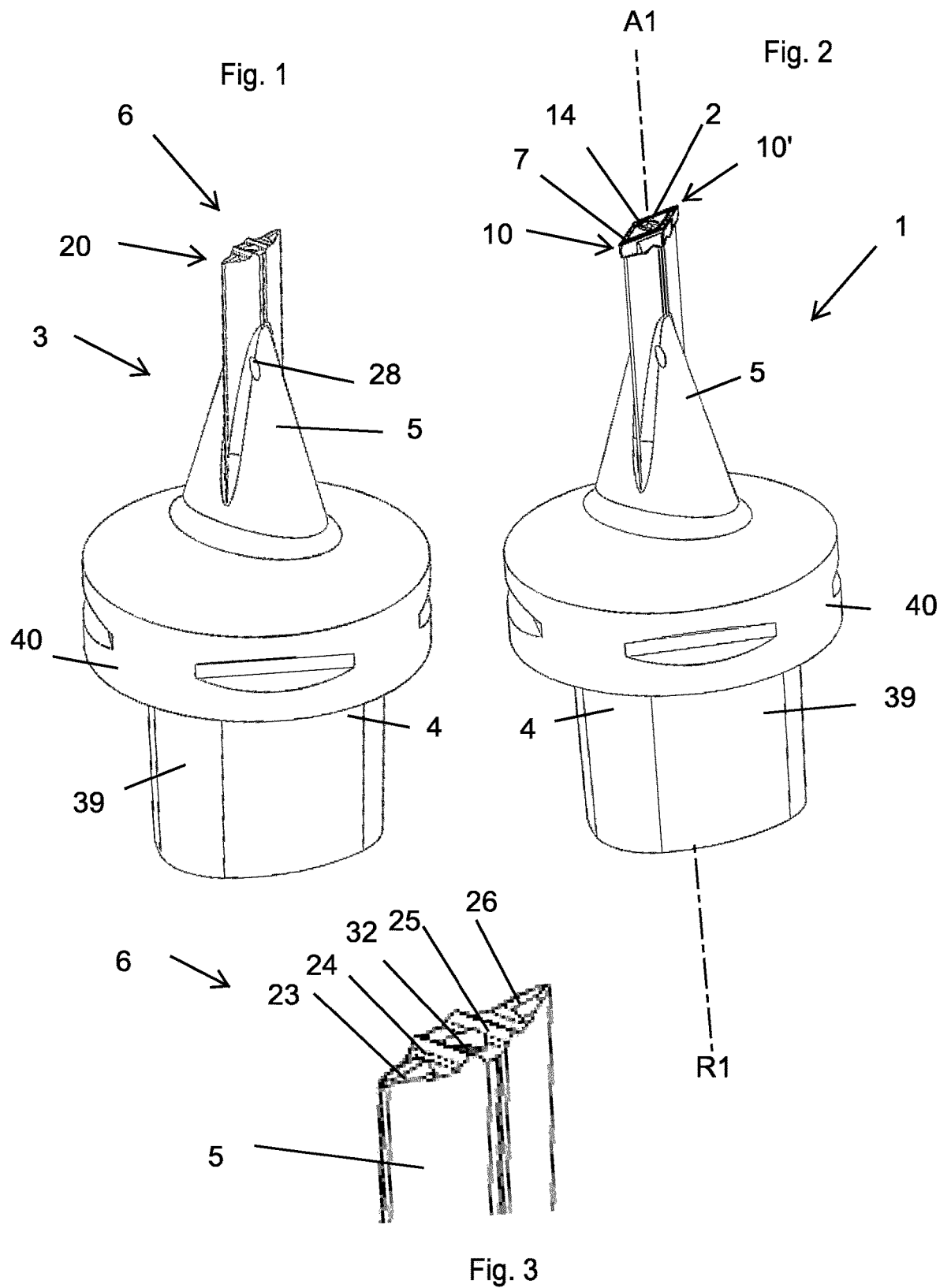

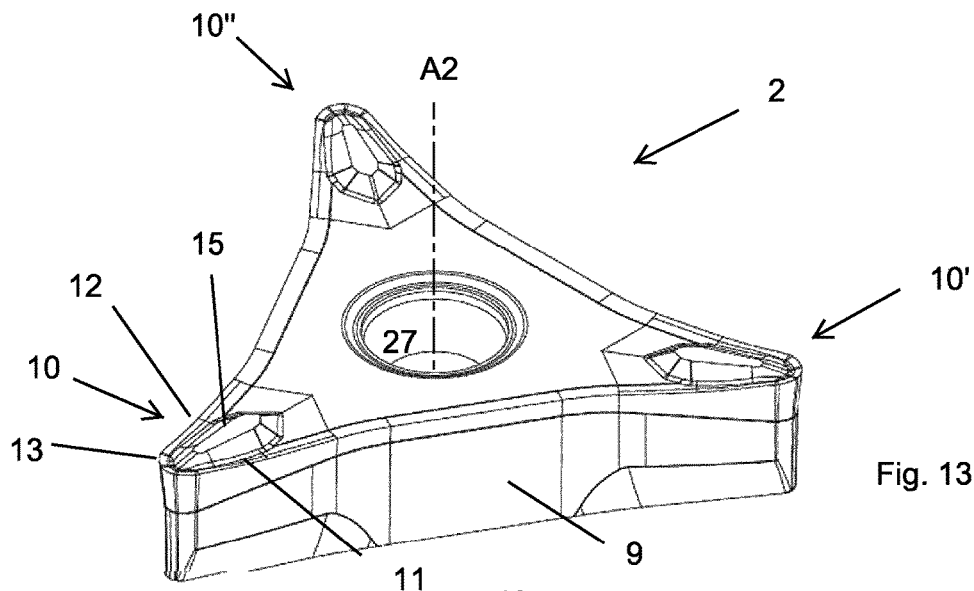
Fig. 13
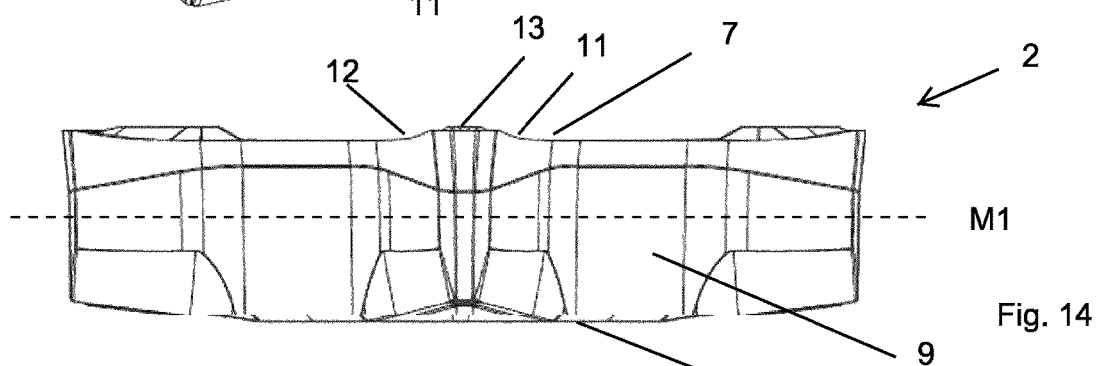
Fig. 14
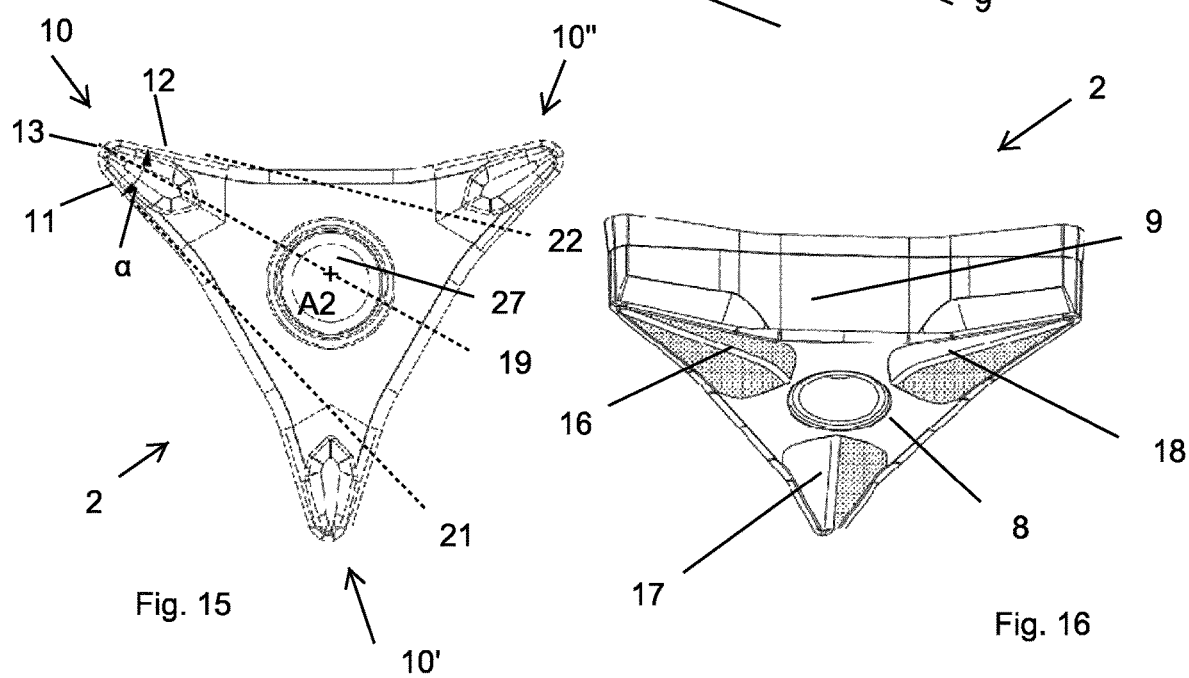
Fig. 15
Fig. 16

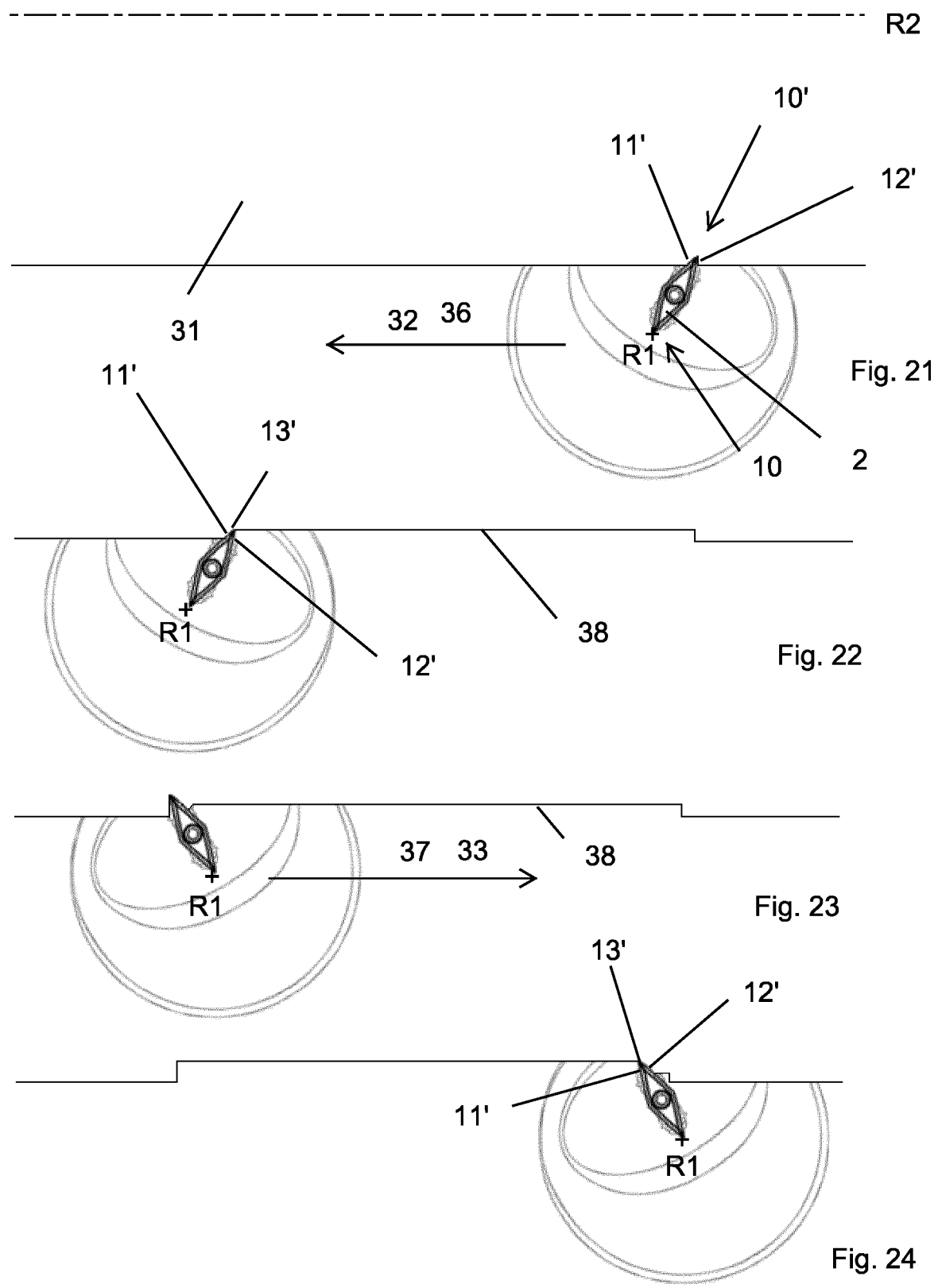

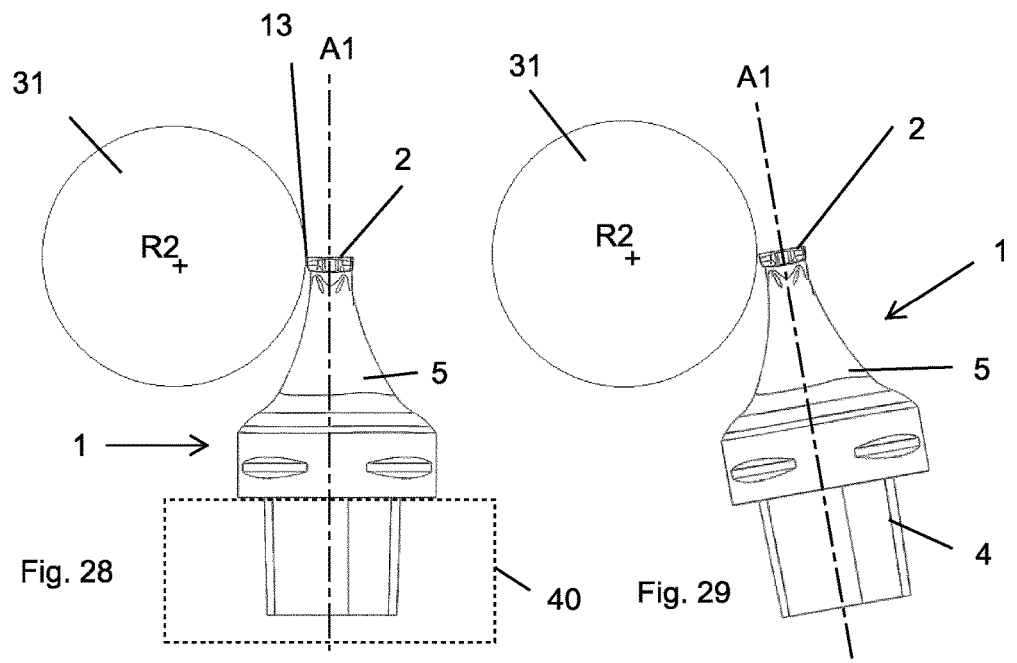
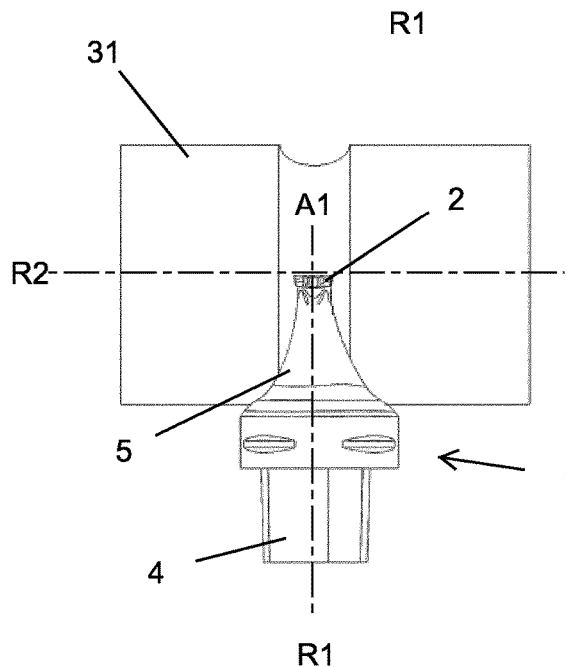
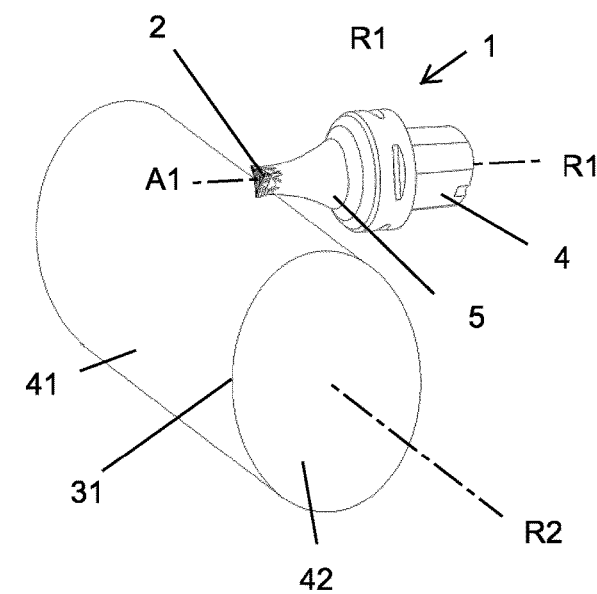
Fig. 28
Fig. 29
Fig. 30
Fig. 31

TURNING TOOL AND TURNING METHOD FOR CNC-MACHINES

RELATED APPLICATION DATA

This application is a § 371 National Stage Application of PCT International Application No. PCT/EP2019/052079 filed Jan. 29, 2019 claiming priority to EP 18160706.0 filed Mar. 8, 2018.

TECHNICAL FIELD OF THE INVENTION

The present invention belongs to the technical field of metal cutting. More specifically the present invention belongs to the field of cutting tools for turning of a metal work piece, by use of computer or computerized numerical control, i.e. CNC, machines.

In particular, the present invention relates to a cutting tool for turning, comprising a coupling portion, an intermediate portion and a cutting portion, the intermediate portion extending between the coupling portion and the cutting portion, the intermediate portion extending along a longitudinal center axis thereof, the cutting portion comprising a first and a second nose portion, the first and second nose portions being permanently connected, the first nose portion comprising a first cutting edge, a second cutting edge, and a convex nose cutting edge connecting the first and second cutting edges, and the first and second cutting edges forming a nose angle less than 90°.

BACKGROUND OF THE INVENTION AND PRIOR ART

In turning of metal work pieces using a CNC-lathe, it is common to use a plurality of cutting tools in order to machine a component having a predefined shape. The predefined shape of the component may vary considerably, and may include different features such as a slot or a groove.

In machining of components, it is a desire to reduce the machining time. One way to reduce the machining time is to reduce the time for tool change.

EP1158378B1 claims to provide a machine tool capable of machining in a plurality of machining modes with a single tool, wherein the loss of machining time due to tool change can be decreased and the number of tools to be prepared can be decreased. A conventional tool is provided comprising a cutting insert, comprising two opposite nose portions of around 55° nose angle, mounted in a tool body, such that one nose portion is a free end and thereby in an active or usable position. A slot machining (tool positions 25F, 25G in FIG. 7) is shown. A so called B-axis can be set to a number of angles.

The inventor has found that although many conventional tools can be replaced by using the above described conventional tool in the above described method, there is a need for an improved cutting tool.

SUMMARY OF THE INVENTION

The inventor has found that there is a need for an improved turning tool which can used in an improved method. For example, when machining a slot using the above described method and tool, the degree of B-angle adjustment possible is limited because of geometrical factors, especially the depth and width of the slot. For a relatively deep and narrow slot, there is an increased risk of interference between the tool body and the work piece. A further need for improvement which the inventor has found relates to the risk of vibrations, especially if cutting tools having a great overhang is used, such as in deep slot turning. A still further need for improvement relates to reducing the down-time for a CNC-machine.

An object of the present invention is to provide an improved turning tool. This is achieved by the cutting tool according to claim 1. In other words, this is achieved by the initially defined cutting tool, which is characterized in that a longitudinal center axis of the coupling portion defines a tool rotational axis, the intermediate portion extending along a longitudinal center axis thereof, the longitudinal center axis being parallel to or co-linear with the tool rotational axis, the cutting portion comprising a top surface, the top surface is facing away from the coupling portion, the first and the second nose portions each form free ends of the cutting tool, in that in a top view, the first and second nose portions form an angle of more than 90° relative to each other measured around the longitudinal center axis of the intermediate portion, and in that in a top view, a first extension line co-linear with the first cutting edge and a second extension line co-linear with the second cutting edge extends on opposite sides relative to the longitudinal center axis of the intermediate portion.

By such a cutting tool, accessibility is improved such that a relatively narrow pocket can be machined. By such a cutting tool, the risk of vibrations is reduced and the risk of deflection of the cutting tool is reduced. By such a cutting tool, it is possible to turn in a first direction using the first cutting edge, rotate the tool around the tool rotational axis, and turn in the opposite direction using the second cutting edge, thereby reducing the machining time. By such a cutting tool, the indexing time is reduced, because change from a used first nose portion in an active position to a second new nose portion in an active position can be made in a short time. Conventionally in turning, indexing is made manually and involves the steps of removing the cutting insert from the insert seat and replacing the worn cutting insert with a new cutting insert. Alternatively, change to a new nose portion can be made by an automatic or manual step which involves removing, i.e. un-clamping, the used cutting tool from the machine interface. Compared to the above described conventional methods using a conventional cutting tool, the present cutting tool provides a less time-consuming option.

The cutting tool is suitable for turning metal work pieces. In other words, the cutting tool is a turning tool which can be used for cutting a rotating metal work piece. The cutting tool comprising a coupling portion is suitable to be connected directly, or by one or more tool devices, to a rotatable machine interface, e.g. a spindle, of a machine tool which can be used for turning, such as e.g. a turning lathe, a multi task machine, a turn-mill machine, or a sliding head machine. The machine tool is preferably a CNC-machine, i.e. computer or computerized numerical control, machine. The coupling portion preferably comprise a conical or substantially conical portion and a ring-shaped portion, such as preferably in the form of a polygonal hollow taper interface with a flange contact surface, such in accordance to ISO 26623-1:2014, or a hollow taper with a flange contact surface such as in accordance to DIN 69893, ISO 12164-1 or ISO 12164-1F.

The conical portion and the ring-shaped portion are preferably concentric. In relation to the conical portion, the ring-shaped portion preferably extends a greater radial distance in relation to the tool rotational axis. A longitudinal center axis of the coupling portion defines a tool rotational axis. In other words, when the coupling portion is mounted in the machine interface, e.g. the machine spindle, the cutting tool is rotatable around the tool rotational axis. In other words, the cutting tool is arranged to be rotatable around the tool rotational axis.

The tool rotational axis is a longitudinal center axis of the coupling portion. The cutting tool is arranged to be rotatable around a tool rotational axis thereof.

The coupling portion is preferably arranged symmetrically or substantially symmetrically around the tool rotational axis.

The coupling portion is preferably permanently connected to the intermediate portion, thereby forming a tool body.

The coupling portion and the intermediate portion are preferably made from steel.

The intermediate portion extends between and connects the coupling portion and the cutting portion.

The intermediate portion extends along a longitudinal center axis thereof. The intermediate portion is preferably arranged symmetrically or substantially symmetrically around the longitudinal center axis thereof.

In cross sections perpendicular to the rotational axis, the intermediate portion preferably is greater in size, i.e. has a larger area at a rear end thereof, i.e. at the intersection between the coupling portion and the intermediate portion, than at a front end thereof, i.e. at the intersection between the intermediate portion and the cutting portion.

The longitudinal center axis being parallel to or co-linear, i.e. co-axial, with the tool rotational axis. The longitudinal center axis being parallel to the tool rotational axis means that the longitudinal center axis is spaced apart from the tool rotational axis.

The cutting tool comprises a cutting portion. The cutting portion defines a front end of the cutting tool. The coupling portion defines a rear end of the cutting tool. The cutting is preferably in the form of a cutting insert made from a hard and wear resistant material such as e.g. cemented carbide, cermet, cubic boron nitride (CBN) or ceramic. The cutting insert is preferably detachably mounted in an insert seat formed in a front end of the intermediate portion.

Alternatively, the cutting portion, the coupling portion and the intermediate portion is a singular body.

The cutting portion comprising a top surface comprising a rake face.

The top surface is facing away from the coupling portion.

The cutting tool is preferably elongated in the direction of the longitudinal center axis of the intermediate portion, such that a distance from the top surface to the clamping portion is greater than a maximum diameter of the cutting tool measured in a plane perpendicular to the longitudinal center axis of the intermediate portion.

The cutting portion comprises a first and a second nose portion. A nose portion can alternatively be designated as a corner portion.

The first and second nose portions are permanently connected to each other. Preferably, the first and second nose portions are in the form of nose portions of one cutting insert.

The first nose portion comprises a first cutting edge, a second cutting edge, and a convex nose cutting edge connecting the first and second cutting edges.

The nose cutting edge is in top view preferably convexly curved, such as a circular arc having a radius of curvature of 0.15-1.3 mm, even more preferably 0.3-0.9 mm. Alternatively, the nose cutting edge may in top view have a convex shape, which convex shape deviates from a perfect circular arc, such as a shape which comprises two or more circular arcs having different radii of curvature. For example, the nose cutting edge may be a so-called wiper nose cutting edge.

Preferably, the nose cutting edge is the most distal portion of the cutting portion in relation to the longitudinal center axis of the intermediate portion.

The top surface preferably comprises chip breaking means, preferably in the form of one or more protrusions, preferably located in the vicinity of i.e. less than 3 mm from the nose cutting edge.

The first and second cutting edges are each in a top view preferably straight or substantially straight. Preferably, in a top view a bisector formed mid-way between the first and second cutting edges intersects the longitudinal center axis of the intermediate portion.

Preferably, the second nose portion comprises a convexly curved nose cutting edge, such that the convexly curved nose cutting edges of the first and second nose portion, respectively, being positioned in a common plane perpendicular to the tool rotational axis.

The first and second cutting edges in a top view forms a nose angle which is less than 90°, preferably 15°-85°, even more preferably 20°-40°.

The first and the second nose portions each form free ends of the cutting tool. The first and the second nose portions each form radially outer portions of the cutting portion, where radially outer refers to the longitudinal axis of the intermediate portion. Formulated differently, the first and the second nose portions comprises radially outer end portions of the front end of the cutting tool.

The first and the second nose portions are arranged to be alternatively active.

The first and second nose portions form radially distal portions of the front end of the cutting tool, where said radial distances is in relation to the longitudinal center axis of the intermediate portion.

The first and second nose portions are preferably located at equal distances from the longitudinal center axis of the intermediate portion. Alternatively, said distances may vary, preferably by less than 30%, even more preferably by less than 10%.

The first and second nose portions may preferably be formed in a corresponding manner. Alternatively, the second nose portion may be arranged differently, i.e. having a different shape or chemical composition, compared to the first nose portion, e.g. having a different shape in a top view and/or comprising a nose cutting edge having a curvature which in a top view differs from a curvature of nose cutting edge of the first nose portion.

In a top view, where the top surface of the cutting portion is facing the viewer, the first and second nose portions form an angle of more than 90°, preferably 120° or 180°, relative to each other, measured around the longitudinal center axis of the intermediate portion.

In a top view, a first extension line co-linear with the first cutting edge and a second extension line co-linear with the second cutting edge extends on opposite sides relative to the longitudinal center axis of the intermediate portion. Preferably, in a top view an extension of a bisector formed between the first and second cutting edges intersect the longitudinal center axis of the intermediate portion.

Preferably, in a top view the cutting portion is inside a circle having a diameter of 50 mm, more preferably inside a circle having a diameter of 35 mm.

Preferably, the cutting tool has a length measured along or parallel to the tool rotational axis which is 80-400 mm, more preferably 90-250 mm. Preferably, the cutting tool has a maximum diameter, measured perpendicular to the tool rotational axis, which is less than the said length of the cutting tool, preferably 0.2-0.8 times said length.

Preferably, the length of the coupling portion measured along or parallel to the tool rotational axis is less than the length of the intermediate portion.

Preferably, the length of the cutting portion measured along or parallel to the tool rotational axis is less than the length of the intermediate portion, more preferably less than 15% of the length of the intermediate portion.

According to an embodiment, the coupling portion and the intermediate portion jointly form a tool body, wherein the cutting portion being in the form of a first cutting insert, wherein a front end of the tool body is defined by a first insert seat for the first cutting insert, wherein the first cutting insert is detachably clamped in the first insert seat by clamping means, wherein the first cutting insert comprising a bottom surface opposite the top surface, wherein a side surface connects the top and bottom surfaces, wherein a mid-plane extends mid-way between the top and bottom surfaces, and wherein the nose cutting edge is in top view convexly curved having a radius of curvature of 0.15-1.3 mm.

By such a cutting tool, only the cutting portion in the form of the first cutting insert needs to be replaced after use, thereby making the cutting tool more economical.

The cutting tool comprises a first cutting insert, preferably made from a hard and wear resistant material suitable for metal cutting, such as preferably cemented carbide. The cutting tool comprises a tool body, preferably made from a comparably less wear resistant material such as e.g. steel. The tool body comprises the coupling portion and the intermediate portion. The coupling portion and the intermediate portion are permanently connected, thereby forming the tool body in the form of a singular body.

The tool body extends longitudinally between a rear end, defined by the clamping portion, and a front end defined by a first insert seat, or insert pocket, for the first cutting insert.

The first cutting insert is detachably or removably clamped or locked in the first insert seat by clamping means, e.g. by means of one or more screws.

The first cutting insert comprises a bottom surface opposite the top surface. The top surface comprises a rake face. A side surface connects the top and bottom surfaces. The side surface comprises a clearing surface. The first, second and nose cutting edges are formed at intersections between the side surface and the top surface.

A mid-plane extends mid-way between the top and bottom surfaces.

The first cutting insert may be mirror-symmetric in relation to the mid-plane. In other words, the first cutting insert may be a so called negative cutting insert.

Preferably, an area of the top surface is greater than an area of the bottom surface, where said areas are defined as the area inside the outer boundary lines of said surfaces. In other words, preferably the first cutting insert is a positive cutting insert. Such an insert gives an improved clearance.

Preferably, the top and bottom surfaces are shaped such that the shapes thereof corresponds or substantially corresponds to each other. For example, if the top surface is generally triangular-shaped, the bottom surface is preferably triangular shaped. Other suitable shapes include a rhombic shape.

The nose cutting edge is in top view convexly curved having a radius of curvature of 0.15-1.3 mm. In other words, in a top view the nose cutting edge is arc-shaped. The nose cutting edge may in top view have a shape of a circular arch. Alternatively, the nose cutting edge may in top view have a shape which is arch-shaped but deviates from a perfect circular arch, such as e.g. a shape commonly known as a wiper nose radius or a wiper radius or a wiper design.

In a top view, the first and the second nose portions preferably extend radially outside a front end of the intermediate portion, i.e. outside the insert seat.

The front end of the intermediate portion, i.e. the front end of the tool body, consists of exactly one insert seat.

According to an embodiment, the mid-plane is perpendicular to the longitudinal center axis of the intermediate portion.

By such a cutting tool, alternating between the first and second nose portions can be made such that the cutting performance is unchanged, e.g. with regards to cutting forces, especially if the insert is 120° or 180° symmetrical in a top view. The first and second nose portions are preferable formed in a corresponding manner. The alternating between the first and second nose portions can preferably be made by rotating the cutting tool around the rotational axis thereof by a predetermined angle, such as 120° or 180°. Said rotating is preferably made as the cutting insert is inactive. Alternating between the first and second nose portions means alternatively positioning the first and second nose portion in an active position. An active position of a nose portion is between the work piece to be machined and the longitudinal center axis of the intermediate portion.

The mid-plane being perpendicular to the longitudinal center axis of the intermediate portion, and thus also perpendicular to the rotational axis.

According to an embodiment, the first insert seat comprises first insert seat rotational locking means, and wherein the first cutting insert comprises first cutting insert rotational locking means co-operating with the first insert seat rotational locking means.

By such a cutting tool, the risk of rotating the cutting insert around an axis parallel to the rotational axis is reduced. In other words, the risk of movement of the cutting insert relative to the insert seat is reduced.

The first insert seat comprises first insert seat rotational locking means, i.e. rotational preventing means, preferably in the form of one or more grooves or ridges. Preferably, said one or more grooves or ridges extends in a direction corresponding to a bisector formed between the first and second cutting edges. Preferably, said at least one or more grooves or ridges includes one or more inclined surfaces, functioning as contact or support surfaces, and such that said one or more inclined surfaces is inclined, preferably by an angle of 5-70°, in relation to a plane perpendicular to the rotational axis.

The first cutting insert preferably comprises first cutting insert rotational locking means, or rotation preventing means, formed in the bottom surface, preferably in the form of one or more protrusions or recesses, even more preferably in the form of one or more grooves or ridges. Preferably, said one or more grooves or ridges extends in a direction corresponding to a bisector formed between the first and second cutting edges. Preferably, said at least one or more grooves or ridges includes one or more inclined surfaces, functioning as contact or support surfaces, and such that said one or more inclined surfaces is inclined, preferably by an angle of 5-70°, in relation to a plane perpendicular to the mid-plane.

Said co-operating rotational locking means may preferably be arranged such that the bottom surface of the first cutting insert comprises two parallel and spaced apart grooves, extending on opposite sides of a cutting insert center axis, and further at least one perpendicular groove extending along the bisector or bisectors of the acute corner or corners of the cutting insert. Said bottom surface is preferably arranged according to or substantially similarly as described in EP1702703A1, even more preferably as described in paragraph [0018] and shown in FIG. 5 in EP1702703A1. The insert seat preferably comprises ridges arranged in a corresponding manner.

Alternatively, said co-operating rotational locking may be arranged such that the side surface of the cutting insert comprises one or more contact surfaces, wherein the insert seat comprises one or more protrusions, and wherein said one or more protrusions is in contact with at least one of said contact surfaces. Relative to a bottom surface of the insert seat, said one or more protrusions extend away from the connecting portion.

According to an embodiment, the first cutting insert rotational locking means are formed in the bottom surface of the first cutting insert.

By such a cutting tool, the accessibility is further improved. For example, a cavity or pocket having a narrow width can be machined using such cutting tool.

The bottom surface of the cutting insert is non-flat. The rotational locking means formed in the bottom surface are in the form of one or more recesses or protrusions, preferably in the form of one or more grooves or ridges.

According to an embodiment, the top surface comprising chip breaking or chip forming means in the form of one or more protrusions and/or depressions.

By such a cutting tool, the chip control and/or chip breaking is improved in a turning operation.

Preferably, the top surface of the first nose portion comprises a protrusion which in a top view is symmetrical or substantially symmetrical in relation to a bisector formed between the first and second cutting edges.

Preferably, the top surface comprises a protrusion which extends beyond a plane, parallel to the mid-plane, comprising the nose cutting edges. In other words, said protrusion extends in a direction away from the mid-plane. Said protrusion is spaced apart from the side surface.

According to an embodiment, the first cutting insert is 180° or 120° symmetrical or substantially symmetrical in a top view.

By such a cutting tool, the cutting tool can be used for a longer time without changing the cutting insert.

The first cutting insert may be single-sided. Alternatively, the first cutting insert may be double-sided, such that the top and bottom surfaces are alternatingly useable.

Preferably, the first cutting insert in a top view comprises at least two but not more than three nose portions.

Preferably, a bisector extending between the first and second cutting edges intersects the longitudinal center axis.

According to an embodiment, the clamping means is in the form of a clamping screw, wherein the first cutting insert comprises a hole for the clamping screw, wherein the hole intersects the top and bottom surfaces, wherein the hole defines a first cutting insert center axis, wherein the first cutting insert center axis is co-linear with the rotational axis, and wherein the longitudinal center axis being co-linear with the tool rotational axis.

By such a cutting tool, an indexing of the first cutting insert can be made in a less complicated way if the first cutting insert is inside a narrow cavity or a narrow pocket. Indexing in this context is made through rotation of the cutting tool around the rotational axis thereof by an angle, preferably 120° or 180°, such that one cutting portion is positioned in an active position.

Thus, the clamping of the cutting insert to the insert seat is achieved by means of a clamping screw. The first cutting insert comprises a hole, intersecting the top and bottom surfaces, through which hole the clamping screw extends. The tool body comprises a threaded hole, co-linear with the first cutting insert center axis, which intersects the insert seat.

The nose cutting edges are spaced apart from the tool rotational axis.

According to an embodiment, the longitudinal center axis being parallel to and spaced apart from the tool rotational axis, and wherein the convex nose cutting edge intersects or substantially intersects the tool rotational axis.

By such a cutting tool, the position for the convex nose cutting edge can be determined in a more convenient manner, thereby making programming of a CNC-lathe easier.

By such a cutting tool, a deeper pocket can be machined because the risk of interference is reduced, when using the second nose portion, especially if the first and second nose portions in a top view form an angle of 180° or substantially 180°.

The convex nose cutting edge intersects or substantially intersects the tool rotational axis. Substantially intersects in this context shall be interpreted such as a mid-point of the convex nose cutting edge is positioned within 0.5 mm from the tool rotational axis.

According to an embodiment, in a top view the intermediate portion is inside an outer boundary line of the coupling portion.

By such a cutting tool, the accessibility is further improved. By such a cutting tool, an indexing of the first cutting insert can be made in a less complicated way if the first cutting insert is inside a narrow cavity or a narrow pocket.

In a top view the intermediate portion is inside an outer boundary line of the clamping portion. In other words, a maximum distance from the tool rotational axis to the intermediate portion is equal to or preferably less than a maximum distance from the tool rotational axis to the coupling portion.

In a top view, preferably the cutting insert is inside an outer boundary line of the coupling portion.

According to an embodiment, the cutting tool comprising a coolant channel, wherein the coolant channel extends between the coupling portion and a nozzle, wherein the nozzle being formed in the intermediate portion, and wherein the coolant channel and the nozzle being arranged to direct a coolant fluid towards the first nose portion.

By such a cutting tool, the wear of the cutting edges may be reduced.

The cutting tool comprises a coolant channel, extending between a coolant channel inlet, formed in the coupling portion, and a coolant channel outlet, i.e. a nozzle. The coolant channel inlet is preferably arranged concentric with the tool rotational axis. The nozzle opens into an external surface of the intermediate portion. The nozzle being positioned longitudinally between the cutting insert and the coupling portion.

The coolant channel and the nozzle are arranged such that a coolant fluid is directed towards the first nose portion, preferably towards a point or an area which is within 2.0 mm from the convex nose cutting edge.

According to an embodiment, the cutting tool comprises a second cutting insert clamped in a second insert seat, wherein the second insert seat is formed in the intermediate portion of the tool body, wherein the second insert seat is positioned longitudinally between and spaced apart from the first cutting insert and the coupling portion.

By such a cutting tool, the time for machining a component can be further reduced, because the change from the first cutting insert to the second cutting insert can be made in a short time.

The cutting tool, more precisely the tool body, comprises a second cutting portion in the form of a second cutting insert clamped or removably fastened, preferably by means of a clamping screw, in a second insert seat.

Preferably, the second cutting insert is different in shape in a top view compared to the first cutting insert. For example, the second cutting insert may be a threading insert or a grooving insert, while the first cutting insert is a turning insert.

The second insert seat is formed in the intermediate portion of the tool body longitudinally between and spaced apart from the first cutting insert and the coupling portion. In other words, the second insert seat is placed rearward of the first insert seat.

Preferably, the second cutting insert is removably fastened in the second insert seat such that at least one nose portion of the second insert is positioned compared to the first nose portion is placed at a greater distance from the longitudinal center axis of the intermediate portion.

Preferably, the second cutting insert is removably fastened in the second insert seat such that at a second cutting insert nose portion in an active position (i.e. radially outer position) in a top view forms equally large angles or substantially equally large angles in relation to the first and second nose portions. For example, when the cutting tool is seen in top view, the first cutting insert may comprise two nose portions which are placed at 6 o'clock and at 12 o'clock, and the second cutting insert may comprise a radially outer nose portion which is placed at approximately 3 o'clock, or alternatively approximately at 9 o'clock, where the time references refers to an analogue 12-hour watch. By such a cutting tool, the clearance is further improved.

Preferably, the cutting tool comprises a third insert seat. Preferably, the third insert seat is positioned opposite or substantially opposite the second insert seat in relation to the longitudinal center axis of the intermediate portion.

Preferably, the third insert seat and the second insert seat are positioned longitudinally at equal distances or substantially equal distances from the clamping portion.

According to an embodiment, the first and second cutting edges in a top view forms a nose angle which is less than 90°.

By such a turning tool, a component having a more complex shape can be machined.

Preferably, said nose angle is 15°-85°.

Even more preferably, said nose angle is 20°-40°.

According to an embodiment, the front end of the tool body consists of exactly one insert seat.

By such a turning tool, a component having a more complex shape can be machined.

According to a further aspect, a turning method for a computerized numerical control lathe is provided comprising the steps of: providing a cutting tool according to any of the preceding claims; providing a metal work piece; rotating the metal work piece around a work piece rotational axis; setting the tool rotational axis perpendicular to or substantially perpendicular to the work piece rotational axis; making a first pass such that the first cutting edge is active and such that the second cutting edge is inactive, making a second pass such that the first cutting edge is inactive and such that the second cutting edge is active, where the second pass is longitudinally or radially opposite or substantially opposite to the first pass; and wherein the method comprises the step of rotating the turning tool around the tool rotational axis during the first pass and/or during the second pass and/or after the first pass but prior to the second pass.

By such a turning method, a predefined feature or a sub-portion of a predefined feature can be machined in a shorter time. For example, compared to conventional longitudinal turning using multiple passes where all passes are in the same direction, the present method is faster because there may be less movement from an end position of a first pass to a start position for a subsequent pass.

Especially, a predefined feature or a sub-portion of a predefined feature comprising a depression or a pocket or a groove can be machined in a shorter time, because only one cutting portion is necessary. The rotation of the cutting tool can be selected to provide sufficient clearance.

Further, by the rotation of the cutting tool, an entering angle can be selected freely, compared to conventional turning where the entering angle is a result of feed direction and tool design. Thus, the tool life and/or chip control can be improved.

By such a method, where the top surface of the cutting portion is facing away from the coupling portion and the tool rotational axis is perpendicular to or substantially perpendicular to the work piece rotational axis, the tangential cutting force is directed towards the machine spindle to which the coupling portion is connected. Thereby, the risk of vibration or deflection is reduced. Thereby, a deeper pocket can be machined.

By such a method, a single cutting tool can be used for machining numerous types of features, thereby reducing the need for tool inventory.

By such a method, the tool life of the cutting portion may be increased because the insert wear may be more evenly distributed along both the first and second cutting edges.

The turning method is for use by means of a computerized numerical control (CNC) lathe suitable for turning, and may be in the form of e.g. a turning lathe, a multi task machine, a turn-mill machine, or a sliding head machine. More specifically, the turning method is a machining sequence where an electronic control system controls movements, including rotations, of a cutting tool and a metal work piece in order to cut a predefined feature into a predefined location of the metal work piece.

Said predefined feature preferably comprises a pocket or a groove. Said predefined feature preferably opens into an outer peripheral surface of the metal work piece.

A metal work piece is provided. The metal work piece may be made from e.g. steel, stainless steel, a Nickel-based super alloy or Aluminum.

The metal work piece is preferably rotationally symmetrical or substantially rotationally symmetrical around a rotational axis thereof.

For example, the metal work piece may be cylindrical or substantially cylindrical.

The metal work piece comprises a peripheral surface. If the metal work piece is cylindrical, the peripheral surface comprises a lateral area or a side area (lateral area $2\pi rh$) and top and bottom base areas (each area, also called base areas, is $\pi r^2$), where r is the radius of the cylinder and h is the height of the cylinder (along the work piece rotational axis).

Even if the metal work piece is not in the form of a cylinder, we can still define a lateral surface, i.e. a surface facing away from the work piece rotational axis, and base surfaces, i.e. surfaces facing in a direction parallel to the work piece rotational axis.

The method comprises the step of rotating the metal work piece around a work piece rotational axis thereof. The metal work piece is clamped by clamping means at a clamping end thereof and the rotation is achieved by means of a motor. The CNC-lathe comprises said motor. The metal work piece rotates such that the speed of a peripheral surface of the metal work piece, is preferably 40-1000 m/min.

The method comprises the step of setting the tool rotational axis perpendicular to or substantially, i.e. less than 15°, perpendicular to the work piece rotational axis. The tool rotational axis and the work piece rotational axis are spaced apart.

The method comprises the step of making a first pass, by moving the cutting tool and the tool rotational axis relative to the metal work piece, such that the first cutting edge is active and is a leading edge or a main cutting edge, and such that the second cutting edge is inactive and is a trailing edge or a secondary cutting edge. The nose cutting edge is a surface generating cutting edge. The first pass creates or forms or results in a machined surface of the metal work piece.

Said first pass may be linear, i.e. along a straight line. Alternatively, said first pass may be curved or non-linear. In either case, said first pass comprises a component which preferably is an axial or longitudinal component, i.e. along the work piece rotational axis, such as longitudinal turning, or alternatively comprises a radial component, which is towards or away from the work piece rotational axis, such as facing or out-facing.

The velocity of said movement combined with the rotational speed of the metal work piece result in a feed rate for the first cutting edge, which feed rate is preferably 0.05-1.5 mm/revolution.

The method comprises the step of making a second pass, by moving the cutting tool and the tool rotational axis relative to the metal work piece, such that the first cutting edge is inactive and is a trailing edge or a secondary cutting edge, and such that the second cutting edge is active and is a leading edge or a main cutting edge. The nose cutting edge is a surface generating cutting edge. The second pass creates a machined surface.

Said second pass may be linear, i.e. along a straight line. Alternatively, said second pass may be curved or non-linear. In either case, said second pass comprises a component which preferably is an axial or longitudinal component, i.e. along the work piece rotational axis, such as longitudinal turning, or alternatively comprises a radial component, which is towards or away from the work piece rotational axis, such as facing or out-facing.

A start position and an end position for the first pass are spaced apart.

A start position and an end position for the second pass are spaced apart.

The velocity of said movement combined with the rotational speed of the metal work piece result in a feed rate for the second cutting edge, which feed rate is preferably 0.05-1.5 mm/revolution.

The second pass is longitudinally or radially opposite or substantially opposite to the first direction. For example, if the first pass or a component thereof is towards a clamping end of the metal work piece, the second pass or a component thereof is away from said clamping end of the metal work piece. In other words, the second pass is longitudinally opposite the first pass.

Another example is if the first pass or a component thereof is towards the work piece rotational axis. In such case, the second pass or a component thereof is away from the work piece rotational axis. In other words, the second pass is radially opposite the first pass.

Formulated differently, either the first and second passes are both related to cutting of the lateral surface of the metal work piece, or the first and second passes are both related to cutting of one base surfaces of the metal work piece. In the first example, the first and second passes can be longitudinal turning or profile turning operations, in opposite directions longitudinally.

In the second example, the first and second passes can be facing operations, such as in-facing and out-facing operations, respectively.

In other words, the expression "the second pass is longitudinally or radially opposite or substantially opposite to the first pass" can be understood as if the first pass comprises a longitudinal component, the second pass comprises an opposite longitudinal component, and if the first pass comprises a radial component, the second pass comprises an opposite radial component.

A second pass which is linear and radial, i.e. perpendicular to the work piece rotational axis is not considered opposite to a first pass which is linear and parallel to the work piece rotational axis, because the second pass has no component which is along the work piece rotational axis.

Preferably, a predefined feature or a sub-portion of a predefined feature formed by the first and second passes is formed completely or to a major extent in a lateral surface of the metal work piece, and in that the opposite components of the first and second direction, respectively are longitudinal.

Alternatively, a predefined feature or a sub-portion of a predefined feature formed by the first and second passes is formed completely or to a major extent in a base surface of the metal work piece, and in that the opposite components of the first and second pass, respectively are radial.

The moving of the tool rotational axis during the first and second pass, respectively, is preferably a parallel movement. In other words, the initial, intermediate and final orientations or positions of the tool rotational axis are parallel.

The first and second passes are automated cutting cycles.

The method comprises the step of rotating the turning tool around the tool rotational axis during the first pass and/or during the second pass and/or after the first pass but prior to the second pass. In other words, the method comprises a rotational movement of the turning tool around the tool rotational axis.

Said rotating of the turning tool around the tool rotational axis is, if during the first and/or second pass, is preferably synchronized with a change of the feed direction such that an entering angle is constant or substantially constant.

The step of rotating the turning tool around the tool rotational axis may be between the first pass and the second pass, i.e. after the first pass but prior to the second pass. In such a case, the turning tool rotates an angle around the tool rotational axis which is less than 360°, preferably 20°-170°, more preferably 40°-130°.

The step of rotating the turning tool around the tool rotational axis may alternatively be during, i.e. simultaneously, as the first pass. In such a case, the turning tool rotates an angle around the tool rotational axis which is less than 360°, preferably 5°-180°, more preferably 10°-170°.

The step of rotating the turning tool around the tool rotational axis may alternatively be during, i.e. simultaneously, as the second pass i.e. the step of moving the tool rotational axis in the opposite second direction. In such a case, the turning tool rotates an angle around the tool rotational axis which is less than 360°, preferably is 5°-180°, more preferably 10°-170°.

The step of rotating the turning tool around the tool rotational axis may alternatively be during, i.e. simultaneously, as the first and second passes. In such a case, the turning tool during the first and second passes, respectively, rotates an angle around the tool rotational axis which preferably is 5°-180°, more preferably 10°-170°. In such a case the direction of rotation during the first pass is opposite to the direction of rotation during the second pass. In other words, if the rotation during the first step is clock-wise, the rotation during the second step is counter clock-wise, and vice versa.

During the first and second passes, the top surface of the cutting portion functions as a rake face or a rake surface.

According to an embodiment, the turning method comprising the further steps of: withdrawing the cutting tool from the metal work piece, and rotating the cutting tool around the tool rotational axis such that the first nose portion is moved away from the metal work piece and such that the second nose portion is moved towards the metal work piece.

By such a method, the indexing time is reduced, because change from a used first nose portion in an active position to a second new nose portion in an active position can be made in a short time. Conventionally in turning, indexing is made manually and involves the step of removing the cutting insert from the insert seat. Alternatively, change to a new nose portion can be made by an automatic or manual step which involves removing the used cutting tool from the machine interface. Compared to the above described conventional methods using conventional cutting tool, the present cutting tool provides a less time-consuming option.

The method thus comprises the step of withdrawing the cutting tool from the metal work piece preferably after the second pass. The cutting tool is withdrawn by enough distance such that sufficient clearance is provided, in order to avoid an interference during the subsequent rotation. Said rotation means rotating the cutting tool around the tool rotational axis such that the first nose portion is moved away from the metal work piece and such that the second nose portion is moved towards the metal work piece. In other words, an indexing is made such that the used first nose portion is brought into an inactive position and such that a new second nose portion is brought into an active position.

Said rotation is preferably equal to or substantially equal to the angular difference in a top view between the first and second nose portions.

Said rotation is preferably equal to or substantially equal to 90°, 120°, 180° or 240°.

Preferably, said method comprises the step of cutting the metal work piece, or a second metal work piece similar or substantially similar to the said metal work piece, using the second nose portion in a corresponding way as for the first nose portion.

According to an embodiment or an aspect a computer program is provided having instructions which when executed by a computer numerical control lathe cause the computer numerical control lathe to perform any of the above described turning methods.

Said computer program having instructions for controlling movement and rotation of the cutting tool, and instructions for rotation of the metal work piece, for removing stock by means of a turning operation according to any of the above defined turning methods.

Said instructions may include cutting data such as cutting speed, feed rate, tool path and cutting depth.

Said computer program may preferably be stored on a computer readable medium.

Preferably, said computer program may be represented by a data stream.

DESCRIPTION OF THE DRAWINGS

The present invention will now be explained in more detail by a description of different embodiments of the invention and by reference to the accompanying drawings.

FIG. 1 is a perspective view of a tool body which is part of a cutting tool according to a first embodiment.

FIG. 2 is a perspective view of a cutting tool according to a first embodiment.

FIG. 3 is a perspective view of the insert seat of the tool body in FIG. 1.

FIG. 13 is a perspective view of the cutting insert in FIG. 9.

FIG. 14 is a side view of the cutting insert in FIG. 13.

FIG. 15 is a top view of the cutting insert in FIG. 13.

FIG. 16 is a further perspective view of the cutting insert in FIG. 13.

FIG. 21 is a start of a first pass according to a turning method using the cutting tool in FIG. 6.

FIG. 22 is an end of a first pass according to a turning method using the cutting tool in FIG. 6.

FIG. 23 is a start of a second pass according to a turning method using the cutting tool in FIG. 6.

FIG. 24 is an end of a second pass according to a turning method using the cutting tool in FIG. 6.

FIG. 28 is a side view of a turning method using the cutting tool in FIG. 9.

FIG. 29 is a side view of a turning method using the cutting tool in FIG. 9.

FIG. 30 is a side view of a turning method in FIGS. 25 and 26.

FIG. 31 is a perspective view of the cutting tool and metal work piece shown in FIG. 28.

Figure 4:
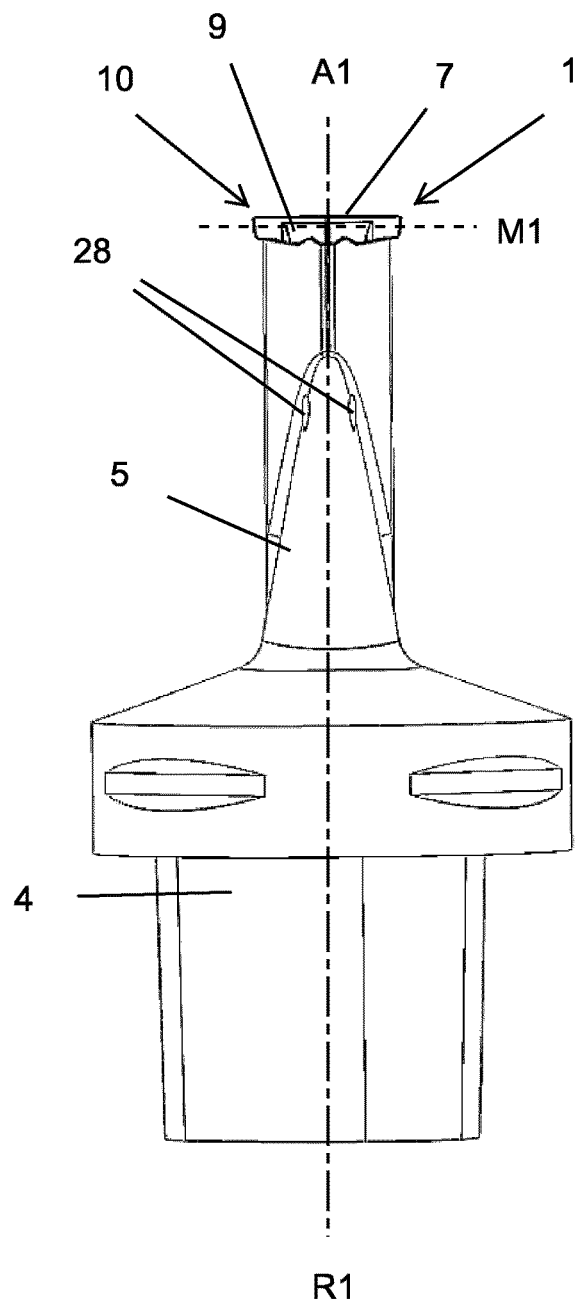
FIG. 4 is a side view of the cutting tool in FIG. 2.

All cutting tool figures have been drawn to scale.

DETAILED DESCRIPTION OF EMBODIMENTS OF THE INVENTION

Reference is made to FIGS. 1-5 which shows a cutting tool 1 according to a first embodiment comprising a tool body 3 and a cutting insert 2. The tool body 3 is shown in FIG. 1 without the cutting insert 2. The cutting tool comprises an insert seat 6 which is shown in FIG. 3. The cutting tool 1 is a turning tool, comprising a coupling portion 4, an intermediate portion 5 and a cutting portion 2. The coupling portion 4 and the intermediate portion 5 are permanently connected and jointly form a tool body 3 made from steel. The cutting portion 2 is in the form of a first cutting insert 2 made from cemented carbide. The cutting tool 1 according to the first embodiment comprises only one cutting insert.

The coupling portion 4 is suitable to a rotatable machine interface (not shown). The coupling portion 4 comprise a substantially conical or tapered portion 39 and a ring shaped portion 40 in accordance to ISO 26623-1:2014.

A front end 20 or a forward end of the tool body 3 is defined by a first insert seat 6 for the first cutting insert 2. The first cutting insert 2 is detachably clamped in the first insert seat 6 by clamping means 14, said clamping means being in the form of a clamping screw 14.

The first cutting insert 2 comprises a bottom surface 8 opposite a top surface 7. A side surface 9 connects the top and bottom surfaces 7, 8.

As seen in FIG. 4, a mid-plane M1 extends mid-way between the top and bottom surfaces 7, 8.

The intermediate portion 5 extends between the coupling portion 4 and the cutting portion 2.

A longitudinal center axis of the coupling portion 4 defines a tool rotational axis R1.

The intermediate portion 5 extends along a longitudinal center axis A1 thereof.

Figure 5:
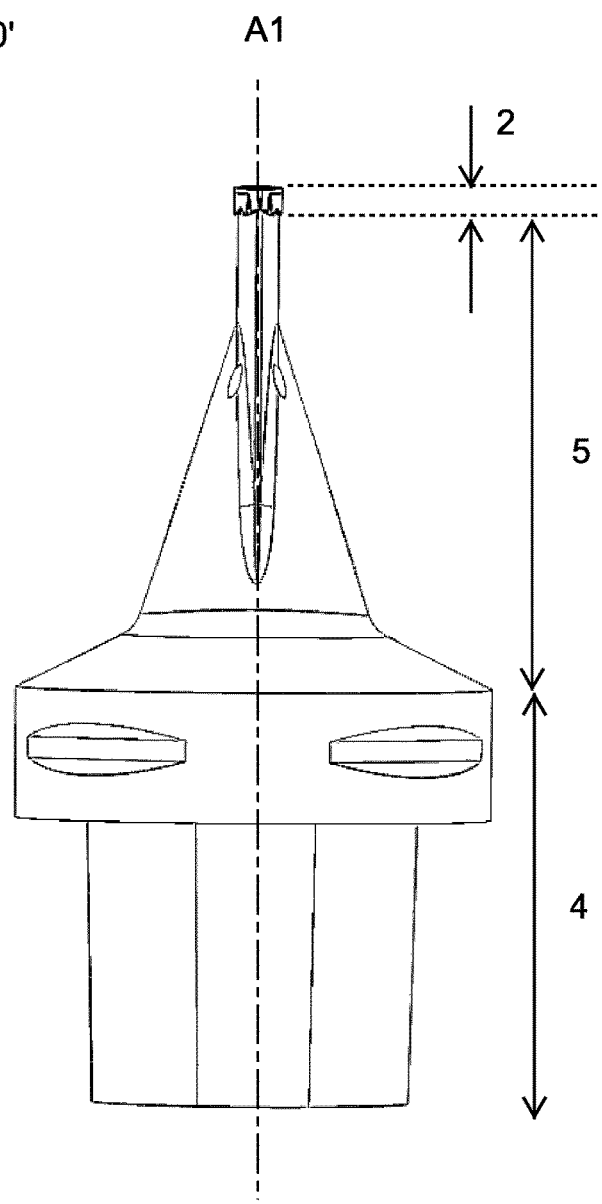
FIG. 5 is a further side view of the cutting tool in FIG. 2.

For the cutting tool 1 according to the first embodiment, the longitudinal center axis A1 is co-linear or co-axial with the tool rotational axis R1, as seen in FIGS. 2, 4 and 5.

The mid-plane M1 is perpendicular to the longitudinal center axis A1 of the intermediate portion 5, and perpendicular to the rotational axis R1.

The top surface 7 of the first cutting insert 2 is facing away from the coupling portion 4. The top surface 7 is non-planar, and comprises chip breaking means or chip breakers, in the form of protrusions.

Figure 8:
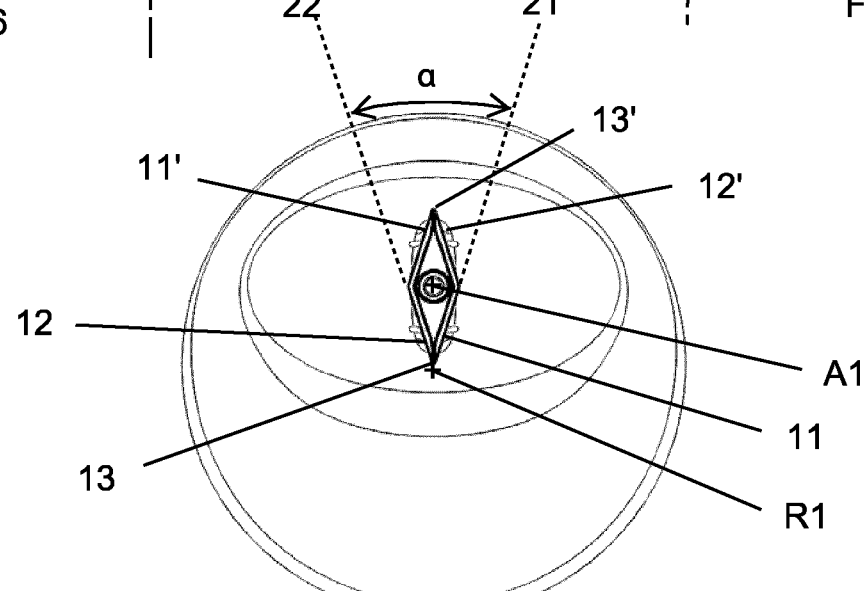
FIG. 8 is a top view of the cutting tool in FIG. 6.
Figure 9:
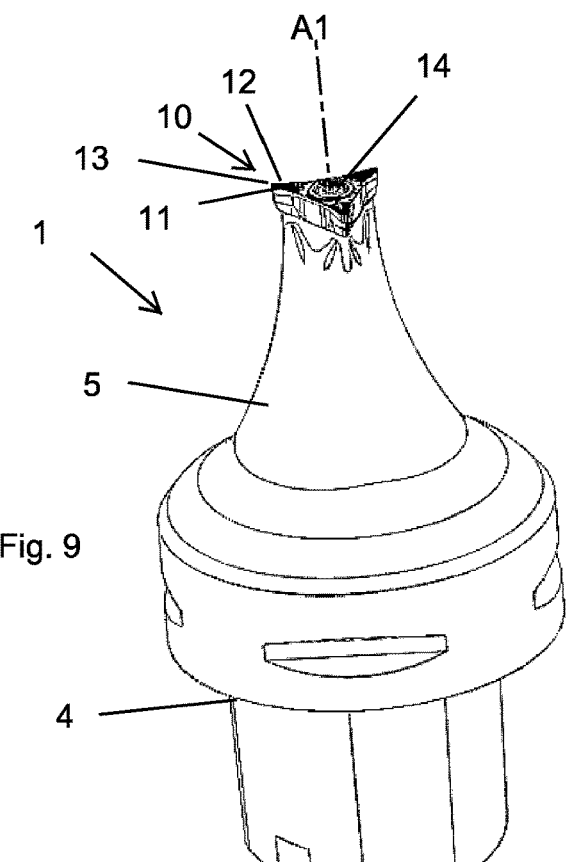
FIG. 9 is a perspective view of a cutting tool according to a third embodiment.
Figure 10:
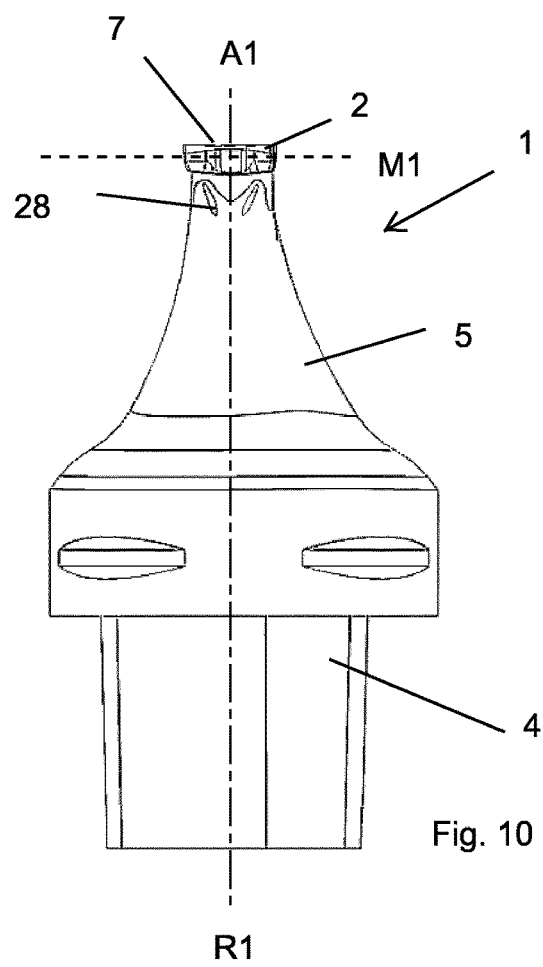
FIG. 10 is a side view of the cutting tool in FIG. 9.
Figure 11:
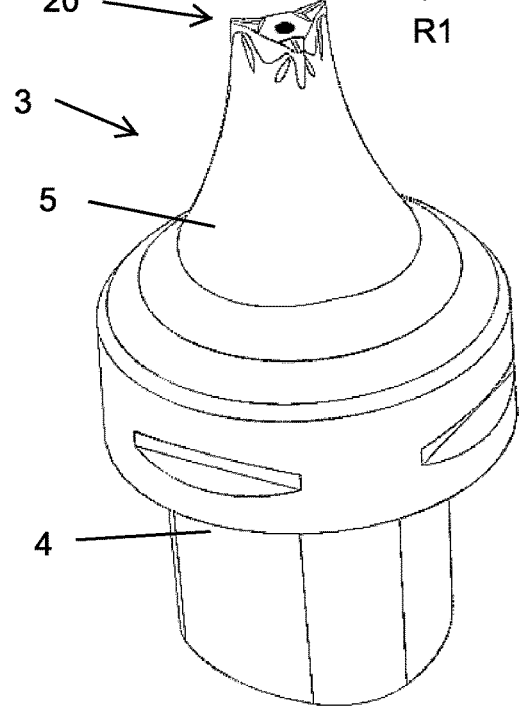
FIG. 11 is a perspective view of the tool body in FIG. 9.

The first cutting insert 2 comprises a first and a second nose portion 10, 10', which each form free ends of the cutting tool 1, The first nose portion 10 comprising a first cutting edge 11, a second cutting edge 12, both straight in a top view, and a convex nose cutting edge 13 connecting the first and second cutting edges 11, 12. The convex nose cutting edge 13 is convex in a top view. The nose cutting edge 13 is in top view convexly curved having a radius of curvature of 0.15-1.3 mm. Although a top view of the cutting tool according to the first embodiment is not shown, a top view of the first cutting insert 2 according to the first embodiment is shown in FIG. 8 which show an identical cutting insert. According to the first embodiment, the radius of curvature is 0.4 mm.

The first and second cutting edges 11, 12 forms a nose angle which is 35°.

In a top view, the first and second nose portions 10, 10' form an angle of 180° relative to each other measured around the longitudinal center axis A1 of the intermediate portion 5.

The first cutting insert 2 is 180° symmetrical symmetric in top and bottom views. The first cutting insert is in a top view parallelogram-shaped.

As seen in FIG. 3, the first insert seat 6 comprises first insert seat rotational locking means comprising ridges 23-26, where two ridges 23, 26 are co-linear, and two ridges 24, 25 are parallel.

The first cutting insert 2 comprises first cutting insert rotational locking means in the form of grooves (not shown), formed in the bottom surface 8, co-operating with the first insert seat rotational locking means 23-26.

The first cutting insert 2 comprises a hole for the clamping screw 14. Said hole 13 intersects the top and bottom surfaces 8, 9, and a center axis thereof defines a first cutting insert center axis co-linear with the rotational axis R1 and the longitudinal center axis A1.

The cutting tool 1 comprising a coolant channel formed in the tool body 3 and extending between the coupling portion 4 and a nozzle 28. Said nozzle 28 is formed in the intermediate portion 5, and the coolant channel and the nozzle 28 are arranged to direct a coolant fluid towards the first and second nose portions 10, 10'.

Reference is now made to FIGS. 9-16 showing a cutting tool 1 according to a third embodiment, comprising a cutting insert 2. The principal differences compared to the cutting tool 1 according to the first embodiment relates to the designs of the cutting insert 2 and the insert seat 6.

In a top view as seen in FIG. 15, a first extension line 21 co-linear with the first cutting edge 11 and a second extension line 22 co-linear with the second cutting edge 12 extends on opposite sides relative to the first cutting insert center axis A2, which axis is co-linear with the rotational axis R1 and the longitudinal center axis A1 when the cutting insert 2 is mounted in the insert seat 6. The previous sentence is true also for the cutting tool 1 according to the first embodiment.

The first cutting insert 2 comprises three nose portions 10, 10', 10". The first cutting insert 2 is 120° symmetrical in top and bottom views.

In a top view as seen in FIG. 15 the first and second cutting edges 11, 12 forms a nose angle α which is 35°.

Figure 12:
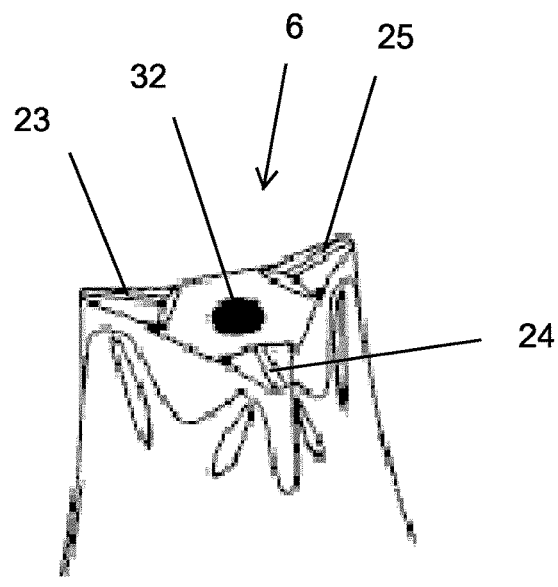
FIG. 12 is a perspective view of the insert seat of the tool body in FIG. 11.

As seen in FIG. 12, the first insert seat 6 comprises first insert seat rotational locking means comprising ridges 23-25, where said ridges 23-25 extend radially in relation to a hole 32 for the clamping screw 14 formed in the first insert seat 6.

The first cutting insert 2 comprises first cutting insert rotational locking means comprising grooves 16-18 formed in the bottom surface 8, co-operating with the first insert seat rotational locking means 23-26.

Reference is now made to FIG. 17-20, showing a cutting tool 1 according to a fourth embodiment. The cutting tool 1 according to the fourth embodiment principally differs from the cutting tool 1 according to the first embodiment in that the cutting tool 1 comprises a second and a third cutting insert 29, 30, clamped our mounted in a second and third insert seat, respectively. Said second and third insert seats are formed in the intermediate portion 5 of the tool body 3 longitudinally between and spaced apart from the first cutting insert 2 and the coupling portion 4.

The second cutting insert 29 and the third cutting insert 30 is each different in shape in a top view compared to the first cutting insert 2. The third cutting insert 30 is a threading insert.

The second and third cutting insert 29, 30 each comprises nose portions, where each of said nose portions comprises a set of cutting edges.

Compared to the first cutting insert 2, the second and third cutting inserts 29, 30 are placed at a greater distance from the longitudinal center axis A1 of the intermediate portion 5.

Figure 20:
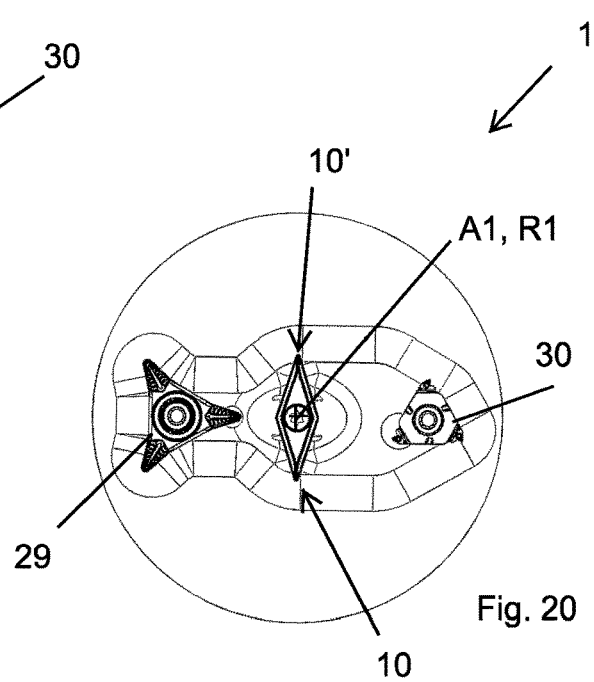
FIG. 20 is a top view of the cutting tool in FIG. 17.

In a top view as seen in FIG. 20, the second and third cutting inserts 29, 30 forms equally large angles or substantially equally large angles in relation to the first and second nose portions. In FIG. 20, the first cutting insert comprise two nose portions 10, 10' which are placed at 6 o'clock and at 12 o'clock, respectively. The second cutting insert 29 is placed at 9 o'clock, and the third cutting insert 30 is placed at 9 o'clock, where the time references refers to an analogue 12-hour watch and relates to the relative position in relation to the longitudinal center axis A1. By such a cutting tool, the clearance is further improved.

Figure 17:
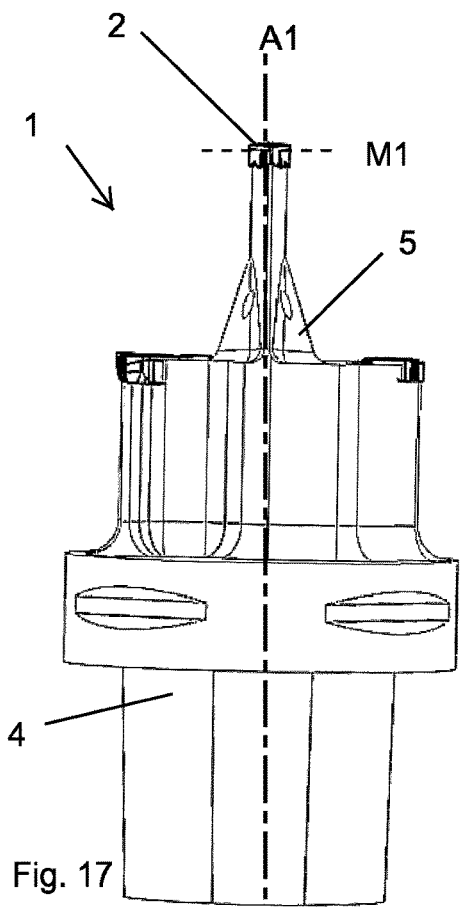
FIG. 17 is a side view of a cutting tool according to a fourth embodiment.
Figure 18:
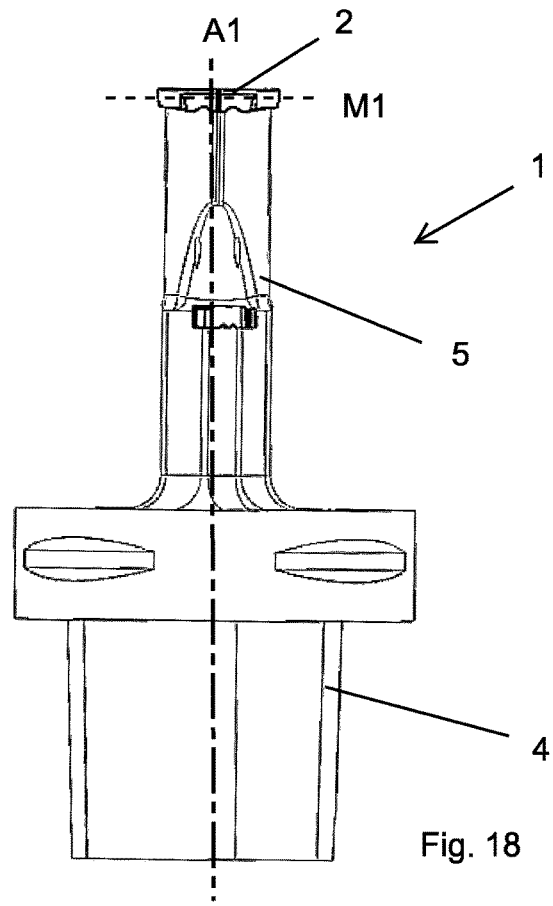
FIG. 18 is a further side view of the cutting tool in FIG. 17.
Figure 19:
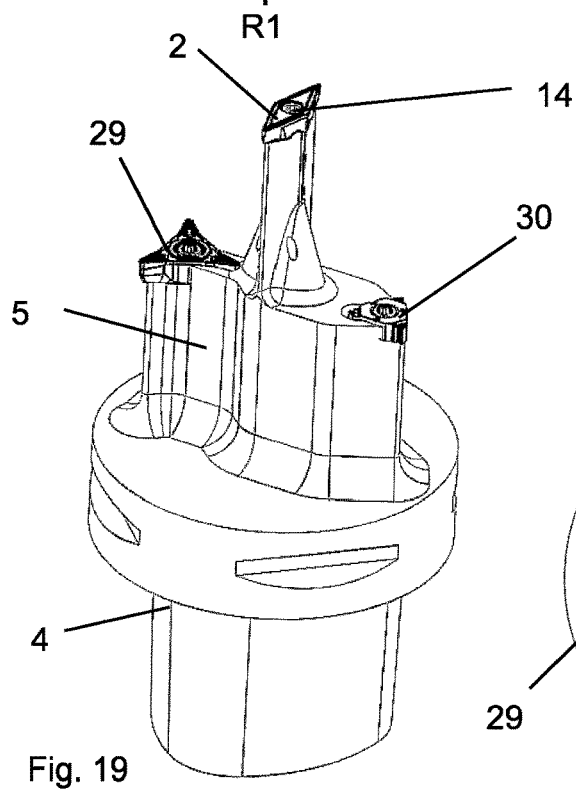
FIG. 19 is a perspective view of the cutting tool in FIG. 17.

As seen in FIG. 17, the second and third cutting inserts 29, 30 are positioned longitudinally at equal distances or substantially equal distances from the clamping portion 4.

Figures 6, 7:
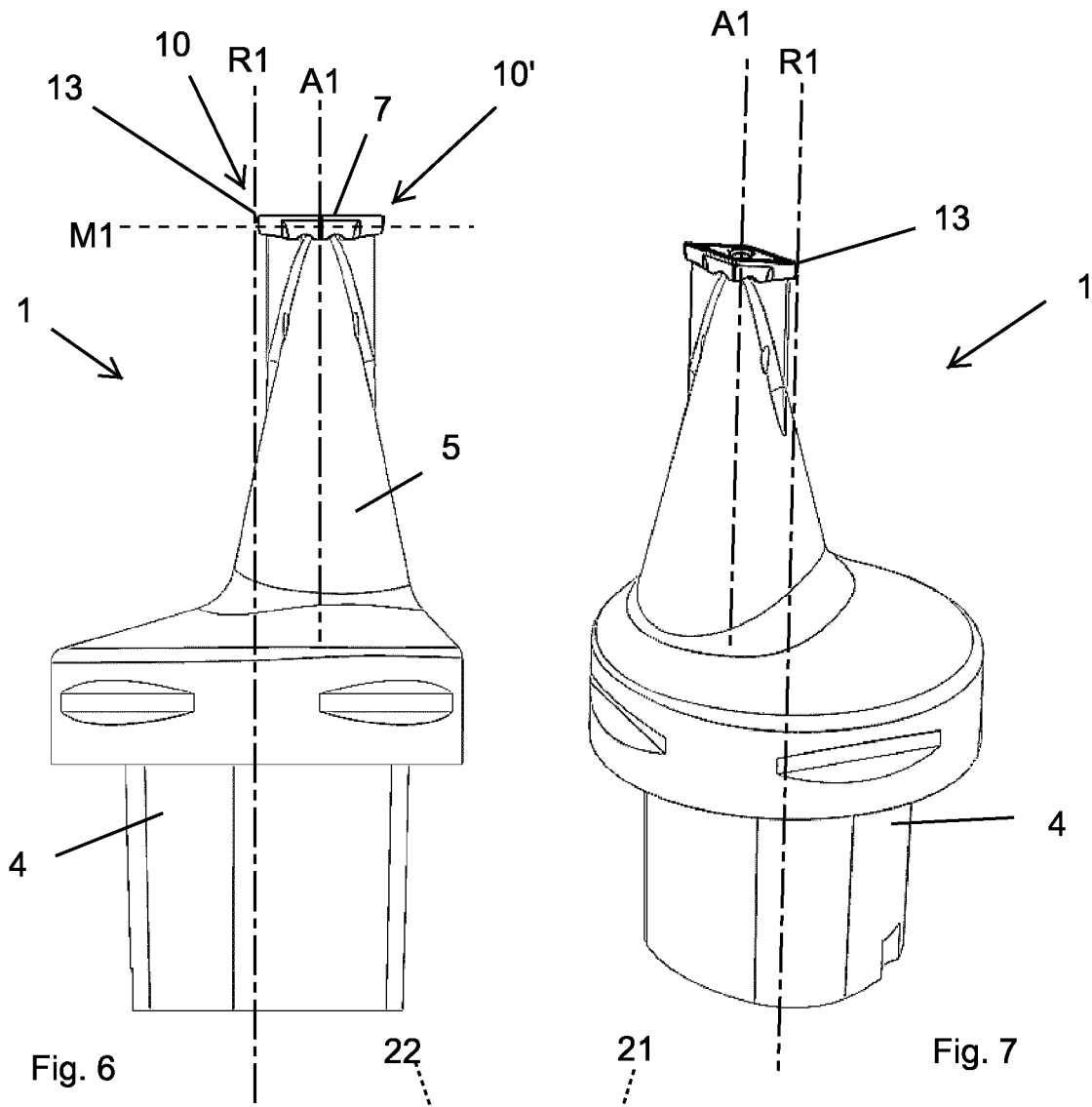
FIG. 6 is a side view of a cutting tool according to a second embodiment.
FIG. 7 is a perspective view of the cutting tool in FIG. 6.

Reference is now made to FIG. 6-8, showing a cutting tool 1 according to a second embodiment. The cutting tool 1 according to the second embodiment principally differs from the cutting tool 1 according to the first embodiment in that for the cutting tool 1 according to the second embodiment, the longitudinal center axis A1 is parallel to and spaced apart from the tool rotational axis R1, and the convex nose cutting edge 13 of the first nose portion 10 intersects or substantially intersects the tool rotational axis R1. In other words, the intermediate portion 5 is offset in relation to the tool rotational axis R1. A mid-point of the convex nose cutting edge 13 of the first nose portion 10 is positioned less than or equal to 0.5 mm from the tool rotational axis R1.

In other respects, the cutting tool 1 according to the second embodiment is similar to the cutting tool 1 according to the first embodiment. For example, in a top view as seen in FIG. 8 a first extension line 21 co-linear with the first cutting edge 11 and a second extension line co-linear with the second cutting edge 12 extends on opposite sides relative to the longitudinal center axis A1 of the intermediate portion 5.

In accordance with the first, third and fourth embodiment, in a top view as seen in FIG. 8, the intermediate portion 5 and the first cutting insert 2 is inside an outer boundary line of the coupling portion 4.

Reference is now made to FIGS. 21-24 showing a first turning method for a computerized numerical control lathe (not shown). The second embodiment cutting tool 1 is provided, although any of the described embodiments may be used. The cutting insert 2 comprises first and second nose portions 10, 10'. In the method in FIGS. 21-24, the second nose portion 10' is in an active position. The method can alternatively be performed where the first nose portion 10 is in an active position. In such case, the cutting tool 1 is 180° rotated around the tool rotational axis R1. A metal work piece 31 is provided, which rotates around a work piece rotational axis R2. The tool rotational axis R1 is perpendicular to the work piece rotational axis R2. In the example, the work piece rotational axis R2 is in a horizontal position and the tool rotational axis R1 is in a vertical position. One possible alternative is to arrange the work piece rotational axis R2 is in a vertical position and the tool rotational axis R1 in a horizontal position.

The method comprises the step of making a first pass 36 by moving the cutting tool 1, seen in top view, such that the first cutting edge 11' is active, such that the second cutting edge 12' is inactive, and such that a machined surface 38 is formed by the nose cutting edge 13'. The start of the first pass 36 is shown in FIG. 21. The end or the finish of the first pass is shown in FIG. 22.

The method comprises the step of making a second pass 37 by moving the cutting tool 1 such that the first cutting edge 11' is inactive, such that the second cutting edge 12' is active, and such that at least a portion of a machined surface 38 from the first pass 36 is machined, where the second pass is longitudinally or radially opposite or substantially opposite to the first pass. The start of the second pass 37 is shown in FIG. 23. The end or the finish of the second pass is shown in FIG. 24. For the method shown in FIGS. 21-24, the second pass is longitudinally opposite to the first pass.

As can be seen from FIGS. 21 and 22, said first pass is linear. Thus, said first pass can be defined by a component 32 which is parallel to the work piece rotational axis R2, i.e. along the work piece rotational axis R2.

As can be seen from FIGS. 23 and 24, said second pass is linear. Thus, said second pass can be defined by a component 33 which is parallel to the work piece rotational axis R2 and opposite to the component 32 for the first direction.

As can be seen in FIGS. 21 and 22, the start and end position for the first pass 36 are spaced apart.

During the first and second passes 36, 37 an entering angle is constant.

After the first pass 36 but prior to the second pass 37, the cutting tool 1 is withdrawn from the metal work piece 31.

After the withdrawing of the cutting tool 1 but prior to the second pass 37, the cutting tool 1 is rotated around the tool rotational axis R1 by an angle which is in the range of 40°-130°.

Figure 25:
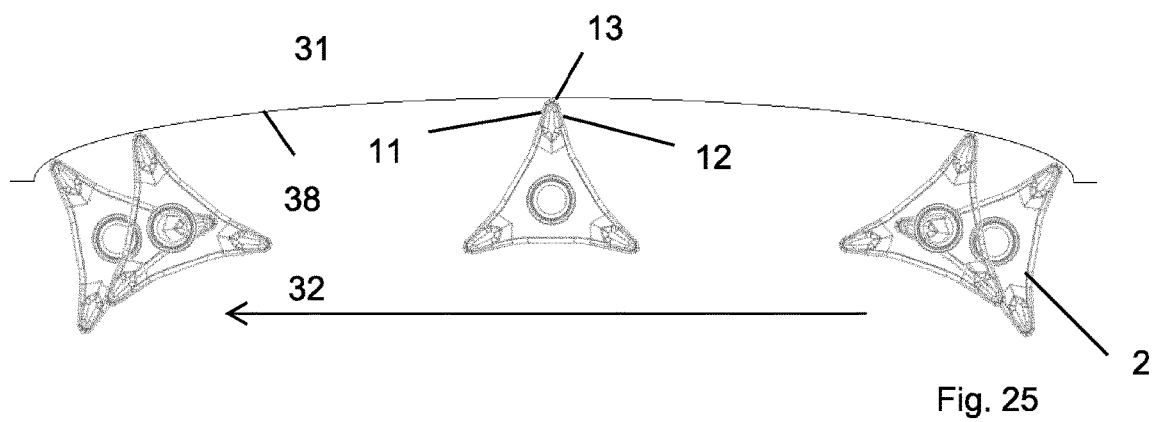
FIG. 25 is an illustration of a first pass according to a turning method using the cutting tool in FIG. 9.
Figure 26:
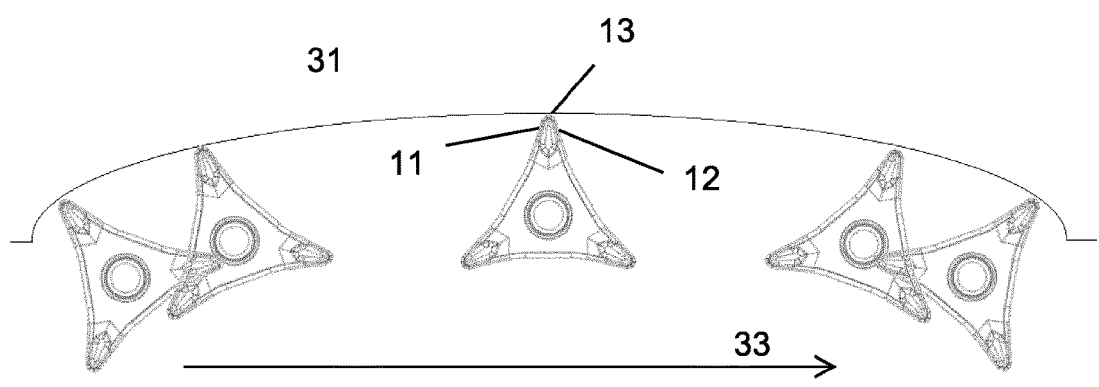
FIG. 26 is an illustration of a second pass according to a turning method using the cutting tool in FIG. 9.

Attention is now drawn to FIGS. 25-26, which show a second turning method using a cutting tool according to the third embodiment. Only the cutting insert 2 is shown. The method can be used using a cutting tool according to any other embodiment.

A metal work piece 31 is provided, which rotates around a work piece rotational axis R2. The tool rotational axis (not shown) is perpendicular to the work piece rotational axis R2. The method comprises the step of making a first pass, shown in FIG. 25, by moving the cutting tool such that the first cutting edge 11 is active, such that the second cutting edge 12 is inactive, and such that a machined surface 38 is formed by the nose cutting edge 13. Five positions of the cutting insert 2 is shown, starting from the right-hand side and moving towards the left-hand side.

The method comprises the step of making a second pass, shown in FIG. 26, by moving the cutting tool such that the first cutting edge 11 is inactive, such that the second cutting edge 12 is active, and such that at least a portion of a machined surface 38 from the first pass is machined. During the first pass the cutting tool rotates in a first direction, counter-clockwise in FIG. 25, around the tool rotational axis.

During the second pass the cutting tool rotates in a second direction around the tool rotational axis, where said second direction, clock-wise in FIG. 26, is opposite to said first direction.

During the first pass as seen in FIG. 25, the cutting tool is moved along a non-linear or curved line. The first pass comprises a longitudinal component 32 which is towards the left-hand side.

During the second pass as seen in FIG. 26, the cutting tool is moved along a non-linear or curved line. The second pass comprises a longitudinal component 33 which is towards the right-hand side, i.e. opposite to the longitudinal component 32 of the first pass.

During the first and second passes, an entering angle is constant.

After the first pass but prior to the second pass, the cutting tool is withdrawn from the metal work piece 31.

Figure 27:
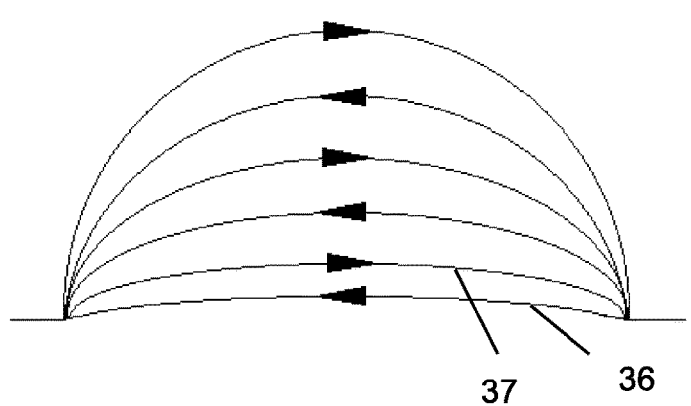
FIG. 27 is an illustration of multiple passes according to a turning method.

Attention is now drawn to FIG. 27, which show a third turning method. Any turning tool embodiment can be used. A first and second pass 36, 37 is shown. Said first and second passes 36, 37 are similar or substantially similar to the second turning method. The first and second passes 36, 37 are repeated in order to progressively cut a predefined feature into the metal work piece. In other words, the third turning method comprises a series of alternating passes of the cutting tool, where subsequent passes are in opposite or substantially opposite directions.

Attention is now drawn to FIG. 28, showing in a side view the relative position and orientation of a metal work piece 31 and a cutting tool 1 according to the third embodiment. Alternatively, any other cutting tool embodiment can be used. The cutting tool 1 comprises a coupling portion 4 clamped to a machine interface 40 of a CNC-lathe (not shown), an intermediate portion 5 and a cutting portion 2 in the form of a cutting insert. A longitudinal center axis of the coupling portion 4 defines a tool rotational axis R1. The intermediate portion 5 extends along a longitudinal center axis A1 thereof. The cutting portion 2 comprises a top surface facing away from the coupling portion 4.

The metal work piece 31 rotates around a work piece rotational axis R2 in a clock-wise direction in FIG. 28.

The tool rotational axis R1 is perpendicular to the work piece rotational axis R2. The tool rotational axis R1 is arranged such that a tangent line of the metal work piece 31 at the point of contact with the convex nose cutting edge 13 intersect the coupling portion 4. The tangential cutting force is directed towards the machine interface 40. The tool rotational axis R1 is spaced apart by a distance from a peripheral surface of the metal work piece 31. The tool rotational axis R1 is parallel to said tangent line.

Attention is now drawn to FIG. 29, showing the relative position and orientation of a metal work piece 31 and a cutting tool 1 according to the third embodiment. The arrangement in FIG. 29 differs from FIG. 28 only in that the tool rotational axis R1 is not parallel to said tangent line, but forms an angle less than or equal to 10° in relation to said tangent line.

Attention is now drawn to FIG. 30, showing a side view of the center position of the cutting insert 2 from FIGS. 25 and 26, including the cutting tool 1.

Attention is now drawn to FIG. 31, showing a perspective view of the arrangement shown in FIG. 28. The metal work piece 31 shown is cylindrical and comprises a lateral surface 31, i.e. a surface facing away from the work piece rotational axis R2, and a base surface 42, i.e. a surface facing in a direction parallel to the work piece rotational axis R2. The metal work piece 31 comprises a second base surface, facing away from the viewer. In the first, second, third turning methods describe above, as well as in the fourth turning method described below, machining is made in a lateral surface 41 of a metal work piece 31. In other words, material is removed by metal cutting from said lateral surface 41. In the fifth turning method described below, machining is made in a base surface 42 of a metal work piece 31.

Figure 32:
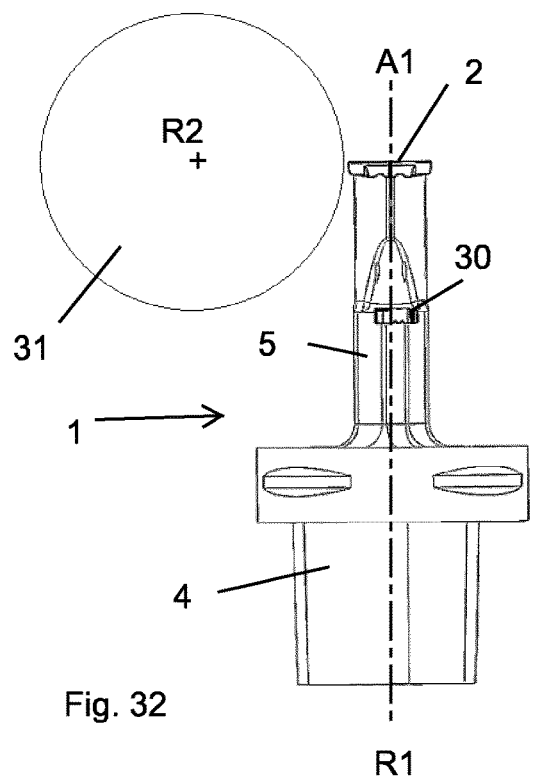
FIG. 32 is a side view of a turning method using the cutting tool in FIG. 17.
Figure 33:
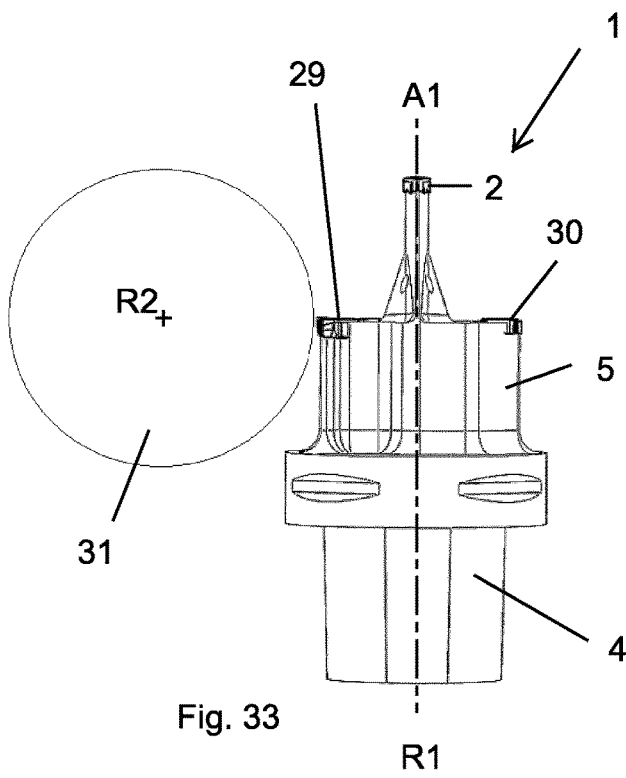
FIG. 33 is a side view of a turning method using the cutting tool in FIG. 17.

Attention is now drawn to FIGS. 32 and 33, showing a fourth turning method, using the cutting tool 1 according to the fourth embodiment.

The method includes any of the above described turning methods, using the first cutting insert 2, where the cutting tool 1 according to the fourth embodiment is in a position relative to the metal work piece 31 as shown in FIG. 32. The method further comprises the steps of withdrawing the cutting tool 1 from the metal work piece 31, and moving the cutting tool 1 in a forward direction along the tool rotational axis R1 to the position shown in FIG. 33. The method further comprises the step of rotating the cutting tool 1 around the tool rotational axis R1 by a predetermined angle, such that the second cutting insert 29 is in an active position.

Said predetermined angle is within the range of 80°-100°

Figure 34:
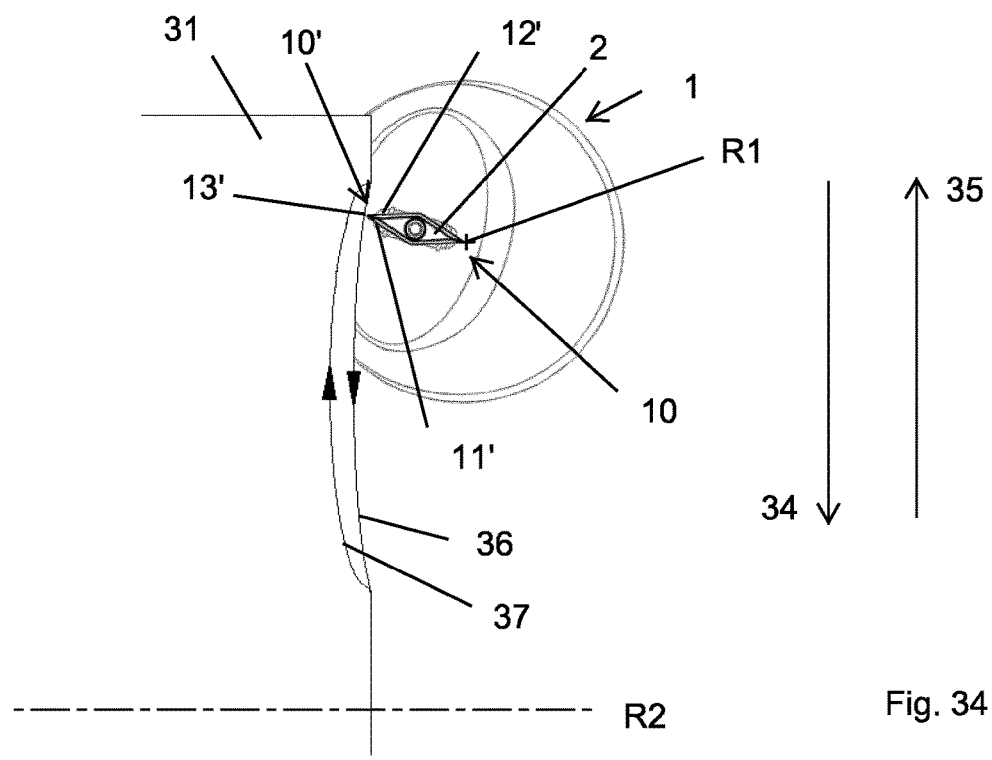
FIG. 34 is a side view of a turning method using the cutting tool in FIG. 6.

Reference is now made to FIG. 34, showing a fifth turning method using the second embodiment cutting tool 1 is provided, although any of the described embodiments may be used.

A metal work piece 31 is provided, which rotates around a work piece rotational axis R2. The tool rotational axis R1 is perpendicular to the work piece rotational axis R2.

Unlike the previous described turning methods, the machining in the fifth turning method is made at a base surface of the metal work piece 31.

The tool rotational axis R1 is perpendicular to the work piece rotational axis R2. In the example, both the work piece rotational axis R2 and the tool rotational axis R1 is in a horizontal position. One possible alternative is to arrange both the work piece rotational axis R2 and the tool rotational axis R1 in a vertical position.

The cutting insert 2 comprises first and second nose portions 10, 10'. In the method in FIG. 34, the second nose portion 10' is in an active position. The method can alternatively be performed where the first nose portion 10 is in an active position. In such case, the cutting tool 1 is 180° rotated around the tool rotational axis R1.

The method comprises the step of making a first pass 36 by moving the cutting tool such that the first cutting edge 11' is active, such that the second cutting edge 12' is inactive, and such that a machined surface is formed by the nose cutting edge 13'.

The method comprises the step of making a second pass 37 by moving the cutting tool such that the first cutting edge 11' is inactive, such that the second cutting edge 12' is active, and such that at least a portion of a machined surface from the first pass 37 is machined.

During the first pass the cutting tool rotates in a first direction, counter-clockwise in FIG. 34, around the tool rotational axis R1.

During the second pass 37 the cutting tool rotates in a second direction around the tool rotational axis, where said second direction, clock-wise in FIG. 34, is opposite to said first direction.

During the first pass 36 the cutting tool is moved along non-linear or curved path. The first pass comprises a radial component 34 which is perpendicular to and towards the work piece rotational axis R2, downwards in FIG. 34.

During the second pass 37 the cutting tool is moved along a path which is non-linear or curved. The second pass comprises a radial component 35 which is perpendicular to and away from the work piece rotational axis R2, upwards in FIG. 34, i.e. opposite to the radial component 34 of the first pass.

During the first and second passes, an entering angle is constant.

After the first pass 36 but prior to the second pass 37, the cutting tool is withdrawn from the metal work piece 31.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "upwards", "lower", "top", "bottom", "forward", "front" and "rear" refer to features as shown in the current drawings and as perceived by the skilled person.

The invention claimed is:

1. A cutting tool for turning, the cutting tool comprising a coupling portion, an intermediate portion and a cutting portion,
   the intermediate portion extending between the coupling portion and the cutting portion, and the intermediate portion extending along a longitudinal center axis thereof, the cutting portion including a first and a second nose portion, the first and second nose portions being permanently connected, the first nose portion comprising a first cutting edge, a second cutting edge, and a convex nose cutting edge connecting the first and second cutting edges, the first and second cutting edges forming a nose angle less than 90°, wherein a longitudinal center axis of the coupling portion defines a tool rotational axis, the longitudinal center axis being parallel to or co-linear with the tool rotational axis, the cutting portion having a top surface, the top surface facing away from the coupling portion, wherein the first and the second nose portions each form free ends of the cutting tool, wherein in a top view, the first and second nose portions form an angle of more than 90° relative to each other measured around the longitudinal center axis of the intermediate portion, and wherein in the top view a first extension line co-linear with the first cutting edge and a second extension line co-linear with the second cutting edge extends on opposite sides relative to the longitudinal center axis of the intermediate portion, wherein the coupling portion and the intermediate portion jointly form a tool body, the cutting portion being in the form of a first cutting insert, wherein a front end of the tool body is defined by a first insert seat for the first cutting insert, wherein the first cutting insert is detachably clamped in the first insert seat by clamping means, the first cutting insert including a bottom surface opposite the top surface, wherein a side surface connects the top and bottom surfaces, wherein a mid-plane extends mid-way between the top and bottom surfaces, and wherein the nose cutting edge is in the top view convexly curved having a radius of curvature of 0.15-1.3 mm, wherein the clamping means is in the form of a clamping screw, wherein the first cutting insert includes a hole for the clamping screw, the hole intersecting the top and bottom surfaces, wherein the hole defines a first cutting insert center axis, wherein the first cutting insert center axis is co-linear with the rotational axis, and wherein the longitudinal center axis is co-linear with the tool rotational axis.

2. The cutting tool according to claim 1, wherein the mid-plane is perpendicular to the longitudinal center axis of the intermediate portion.

3. The cutting tool according to claim 1, wherein the first insert seat includes first insert seat rotational locking means, and wherein the first cutting insert includes first cutting insert rotational locking means co-operating with the first insert seat rotational locking means.

4. The cutting tool according to claim 3, wherein the first cutting insert rotational locking means is formed in the bottom surface of the first cutting insert.

5. The cutting tool according to claim 1, wherein the top surface includes chip breaking or chip forming means formed of one or more protrusions and/or depressions.

6. The cutting tool according to claim 1, wherein the first cutting insert is 180° or 120° symmetrical or substantially symmetrical in the top view.

7. The cutting tool according to claim 1, wherein the longitudinal center axis is parallel to and spaced apart from the tool rotational axis and wherein the convex nose cutting edge intersects or substantially intersects the tool rotational axis.

8. The cutting tool according to claim 1, wherein in the top view the intermediate portion is inside an outer boundary line of the coupling portion.

9. The cutting tool according to claim 1, wherein the cutting tool includes a coolant channel, wherein the coolant channel extends between the coupling portion and a nozzle, the nozzle being formed in the intermediate portion, wherein the coolant channel and the nozzle are arranged to direct a coolant fluid towards the first nose portion.

10. The cutting tool according to claim 1, wherein the cutting tool includes a second cutting insert clamped in a second insert seat, wherein the second insert seat is formed in the intermediate portion of the tool body, and wherein the second insert seat is positioned longitudinally between and spaced apart from the first cutting insert and the coupling portion.

11. The cutting tool according to claim 1, wherein the front end of the tool body consists of exactly one insert seat.

12. A turning method for a computerized numerical control lathe comprising the steps of:
   providing a cutting tool according to claim 1;
   providing a metal work piece;
   rotating the metal work piece around a work piece rotational axis;
   setting the tool rotational axis perpendicular to or substantially perpendicular to the work piece rotational axis;
   making a first pass such that the first cutting edge is active and such that the second cutting edge is inactive;
   making a second pass such that the first cutting edge is inactive and such that the second cutting edge is active, where the second pass is longitudinally or radially opposite or substantially opposite to the first pass; and
   rotating the turning tool around the tool rotational axis during the first pass and/or during the second pass and/or after the first pass but prior to the second pass.

13. The turning method according to claim 12, comprising the further steps of:
   withdrawing the cutting tool from the metal work piece; and
   rotating the cutting tool around the tool rotational axis such that the first nose portion is moved away from the metal work piece and such that the second nose portion is moved towards the metal work piece.

14. A computer program having instructions, which when executed by a computer numerical control lathe cause the computer numerical control lathe to perform the method according to claim 12.

\* \* \* \* \*